US006094584A

United States Patent [19]
Khanna et al.

[11] Patent Number: 6,094,584
[45] Date of Patent: Jul. 25, 2000

[54] METHOD FOR OPERATING A WIRELESS TELECOMMUNICATIONS SYSTEM

[75] Inventors: Sanjeev Khanna, Highland Park; Krishnan Kumaran, Scotch Plains, both of N.J.

[73] Assignee: Lucent Technologies, Inc., Murray Hill, N.J.

[21] Appl. No.: 09/048,443

[22] Filed: Mar. 26, 1998

[51] Int. Cl.[7] ............................... H04B 7/00; H04Q 7/20
[52] U.S. Cl. ........................................... 455/512; 455/452
[58] Field of Search .................................... 455/452, 453, 455/63, 67.3, 447, 448, 34.1, 33.1, 512, 450, 428; 370/330

[56] References Cited

U.S. PATENT DOCUMENTS

| | | | |
|---|---|---|---|
| 5,070,453 | 12/1991 | Duffany | 364/402 |
| 5,513,379 | 4/1996 | Benveniste et al. | 455/33.1 |
| 5,603,082 | 2/1997 | Hanabe | 455/33.1 |
| 5,787,358 | 7/1998 | Takahashi | 455/512 |
| 5,828,948 | 10/1998 | Almgren et al. | 455/34.1 |

*Primary Examiner*—William Cumming

[57] ABSTRACT

A method for operating a wireless telecommunications system whereby communication channels are efficiently allocated to cells of the system is provided. In accordance with an illustrative embodiment of the present method, call demand information is obtained for each cell in the wireless system and converted to a channel demand. Once the channel demand for each cell is known, a tentative channel allocation is performed. Call demand information can be obtained as frequently as desired to update channel allocation throughout the wireless system. In some embodiments, the method for channel allocation described herein can be used alone to allocate channels. In other embodiments, the present method for channel allocation can be used on an hourly, daily, or other temporal basis, as appropriate, to provide a channel allocation which is then updated on a substantially continuous basis by any conventional dynamic channel allocation scheme. To allocate channels, an "interference graph" that relates interfering cells to one another is defined. When nearest-cell interference is considered, an initial step is performed wherein three channels are iteratively allocated to all cells in the system to remove all groupings within the interference graph comprising three mutually-interfering cells. During the initial step, the allocation of three channels reduces channel demand by one in every cell. Once the interference graph is free of such three-membered groupings, channel demand is reduced more efficiently wherein no more than five channels are allocated to satisfy two units of channel demand. To do so, a decomposition/reconstruction operation is performed wherein the interference graph is segregated into groupings of cells to which channels are allocated. The operation for allocating channels to cells when nearest- and next-to-nearest-cell interference is considered does not use the initial step of allocating three channels. It does, however, proceed in a manner analogous to the decomposition/reconstruction process mentioned above, although the operation is performed on a cell-by-cell basis, rather than with groupings of cells.

14 Claims, 27 Drawing Sheets

100

METHOD FOR OPERATING A WIRELESS TELECOMMUNICATIONS SYSTEM

FIELD OF THE INVENTION

The present invention relates generally to telecommunications. More particularly, the present invention relates to a method for operating a wireless telecommunications system wherein communication channels are efficiently allocated to the various cells of the system to satisfy call demand.

BACKGROUND OF THE INVENTION

FIG. 1 depicts a schematic diagram of a portion of a typical wireless communications system in the prior art. Such a system provides wireless telecommunications service to a number of wireless terminals (e.g., wireless terminals 101-1 through 103-1) that are situated within a geographic region.

The heart of a typical wireless telecommunications system is Wireless Switching Center ("WSC")120, which may also be known as a Mobile Switching Center ("MSC") or a Mobile Telephone Switching Office ("MTSO"). Typically, WSC 120 is connected to a plurality of base stations (e.g., base stations 103-1 through 103-5) that are dispersed throughout the geographic area serviced by the system. Additionally, WSC 120 is connected to local- and toll-offices (e.g., local-office 130, local-office 138 and toll-office 140). WSC 120 is responsible for, among other things, establishing and maintaining calls between wireless terminals and between a wireless terminal and a wireline terminal, which is connected to the system via the local and/or long-distance networks.

The geographic area serviced by a wireless telecommunications system is partitioned into a number of spatially-distinct areas called "cells." As depicted in FIG. 1, each cell is schematically represented by a hexagon; in practice, however, each cell usually has an irregular shape that depends on terrain topography. Typically, each cell contains a base station, which comprises radios and antennas that the base station uses to communicate with the wireless terminals in that cell and also comprises the transmission equipment that the base station uses to communicate with WSC 120.

As an example of wireless telecommunications, when wireless terminal 101-1 desires to communicate with wireless terminal 101-2, wireless terminal 101-1 transmits the desired information to base station 103-1, which relays the information to WSC 120. Upon receiving the information, and with the knowledge that it is intended for wireless terminal 101-2, WSC 120 then returns the information to base station 103-1, which relays the information, via radio, to wireless terminal 101-2.

The wireless communications described above occur over a plurality of communications channels. Such channels are characterized by a carrier frequency, and a bandwidth (e.g., 30 kHz) over which the carrier frequency is modulated to carry information content. Wireless service providers license, at a very substantial cost, a band of frequency spectrum sufficient to provide an adequate number of communication channels for supporting communications within a given wireless system.

The amount of spectrum that a provider must obtain to support such communications is predominantly a function of (1) the amount of spectrum that a channel consumes, (2) the extent to which channels used in any one of the cells can be reused in other cells, (3) the traffic demand on the system, and (4) the acceptable percentage of blocked call attempts.

Regarding (2), channel reuse is limited by channel interference. Such interference, which may occur between cells ("co-channel interference") and between numerically-consecutive or nearly-consecutive carrier frequencies ("adjacent-channel interference"), must be kept within acceptable limits.

Since spectrum is very expensive, it is disadvantageous for a provider to license substantially more spectrum than is required for supporting communications within its wireless telecommunications system. As such, it would be advantageous to have an efficient method for allocating spectrum (i.e., assigning channels to each cell in the system) to minimize system-wide channel requirements.

One class of allocation method is referred to as dynamic channel allocation ("DCA"). DCA schemes usually have a local focus wherein changes in call demand between nearby cells, perhaps at a number of locations throughout a wireless telecommunications system, provide the basis for a revised channel allocation that is provided by a DCA model. Such models may be used to reallocate channels on an up-to-the-minute basis. While the prior art provides a variety of DCA schemes, as a class they typically suffer from several drawbacks, as described below.

First, typical DCA models may be less reliable when used to reallocate channels as a result of relatively larger changes in call demand, such as may occur hourly (i.e., "rush" hour versus off-peak hours), daily (i.e., Monday–Friday versus the weekend), or seasonally. Second, such DCA methods are not necessarily efficient from the point of view of channel allocation on a system-wide basis. Provided with a first estimate, perhaps from a characteristic frequency reuse pattern, a DCA method is used to "fine tune" the system. To the extent that the original estimate does not efficiently allocate channels, the DCA will usually not improve allocation efficiency because of its local rather than global focus.

Thus, it would be advantageous to have a channel allocation method that is efficient regardless of the extent of system perturbations and does not depend upon the efficiency of an initial channel allocation estimate.

SUMMARY OF THE INVENTION

In accordance with an illustrative embodiment of the present invention, a method for operating a wireless telecommunications system whereby communication channels are efficiently allocated to cells of the system is provided.

It is implicit in the procedure for allocating channels that no mutually "interfering" cells (more properly, base stations) use the same channel (i.e., frequency). In a first embodiment, the present method is applied to a situation wherein only those cells that are adjacent or "nearest" to one another are considered to be interfering. In a second embodiment, the present method is applied to a situation wherein nearest and "next-to-nearest" cells are considered to be interfering.

Unlike many conventional DCA allocation methods, the present invention provides a way to allocate channels at a determinable minimum efficiency. More particularly, when using the present method, an upper bound on the number of channels required to satisfy system-wide call demand can be determined. The channel allocation efficiency is greater than that of conventional DCA allocation methods. This is because rather than updating the allocation based on (1) local changes and (2) a first, perhaps inefficient channel allocation, the present method provides an allocation based on the channel demand in each cell of the wireless system. The efficiency of the present method thus does not depend upon the typically low efficiency of a first channel allocation estimate.

In accordance with an illustrative embodiment of the present method, call demand information is obtained for each cell in the wireless system and converted to a channel demand. Once the channel demand for each cell is known, an "interference graph" that relates interfering cells to one another is defined. When nearest-cell interference is considered, an initial step is performed wherein three channels are iteratively allocated to all cells in the system to "remove" all groupings within the interference graph comprising three mutually-interfering cells ("triangles"). During the initial step, the allocation or assignment of three channels reduces channel demand by one in every cell.

Once the interference graph is "triangle free," channel demand is reduced more efficiently (2 units of demand by allocating no more than five channels). To do so, the interference graph is "decomposed" by "removing" discrete portions of the graph, which are characterized as "ears" or "chains" depending upon the manner in which such portions are linked to other portions of the graph. The decomposition process continues until a single base cycle remains. A maximum of five channels are allocated to the base cycle to reduce channel demand of each cell therein by two units. After allocating channels to the base cycle, the last portion of the interference graph that was "removed" during the decomposition process is "added back" to the base cycle. The same five channels (at a maximum) are allocated to satisfy two units of channel demand in each cell in the added portion. After allocating channels to the added portion, the next-to-last portion of the interference graph that was removed during decomposition is added back, and the same five channels (maximum) are allocated to satisfy two units of channel demand in the cells therein. The iteration is continued, portion by portion, until the five channels have been allocated, as necessary, to every cell having unsatisfied demand in each "ear" or "chain" in the interference graph. Additional iterations of the aforedescribed five-channel-allocation operation is performed, as required, to satisfy the full channel demand in the system.

The operation for allocating channels to cells when nearest- and next-to-nearest-cell interference is considered is analogous to the operation described in the previous paragraph. In particular, the interference graph is decomposed by "removing" a single cell at a time (rather than groups thereof defining chains or ears). The decomposition process continues until a single cell remains. That cell is assigned the lowest-indexed channels available as required to satisfy the full channel demand of the cell. After channels are allocated to the remaining cell, the last cell removed during the decomposition process is added-back to the final remaining cell, and the next lowest-indexed channels available are allocated thereto. The operation continues until all cells have been added-back and channels are assigned thereto in sufficient number to satisfy the full channel demand for each cell.

Call demand information can be obtained as frequently as desired to update channel allocation throughout the wireless system. In some embodiments, the method for channel allocation described herein can be used alone to allocate channels. In other embodiments, the present method for channel allocation can be used on an hourly, daily, or other temporal basis, as appropriate, to provide a channel allocation which is then updated on a substantially continuous basis by any conventional DCA scheme.

BRIEF DESCRIPTION OF THE DRAWINGS

FIG. 11a depicts an additional cells comprising an "ear" attached to the cycle of FIG. 10a.

FIG. 12a depicts additional cells comprising a "chain" attached to the cycle of FIG. 10a.

FIG. 13b depicts a channel demand in each cell of the wireless telecommunications system of FIG. 13a.

FIG. 15c depicts a channel allocation in accordance with the present teachings for all cells in the wireless telecommunications system of FIG. 13a.

DETAILED DESCRIPTION

Figure 2A:
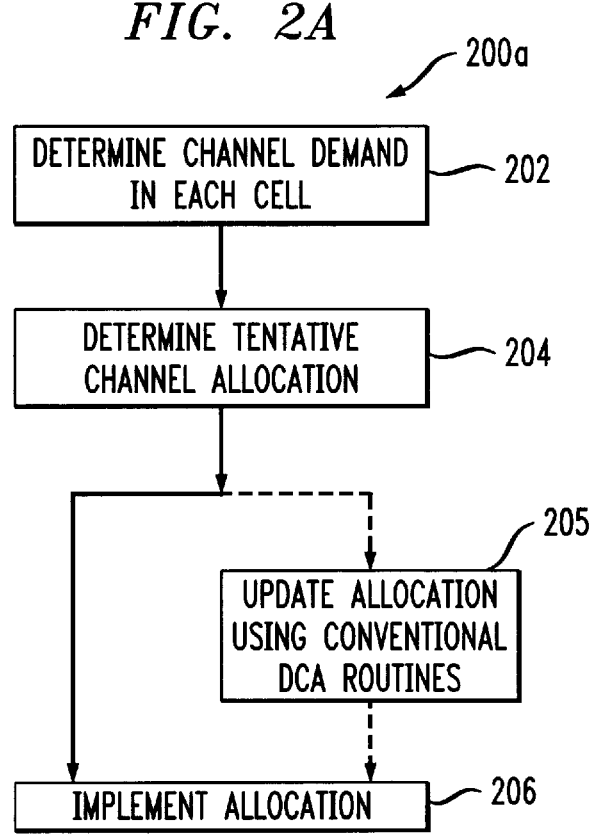
FIG. 2a depicts a method for operating a wireless telecommunications system in accordance with an illustrative embodiment of the present invention.

In accordance with an illustrative embodiment of the present invention, a method for operating a wireless telecommunications system wherein communication channels are efficiently allocated among the cells of the system is provided. In a first operation 202 of illustrative method 200a (FIG. 2a) in accordance with the present teachings, a channel demand is determined for each cell in a wireless system. Such channel demand is determined based on a prevailing call or traffic demand in each cell according to known methods. See, for example, U.S. patent application Ser. No. 09/048,384 filed on even date herewith, entitled "Wireless Telecommunications System and Method for Designing Same," Atty. Dkt.: Khanna 2-5, incorporated by reference herein.

Based on the channel demand in each cell, specific channels are tentatively assigned or allocated to each cell in operation 204. In one embodiment of illustrative method 200a, the tentative channel assignments determined in operation 204 are implemented in operation 206 in accordance with known methods. Call demand information can be obtained as frequently as desired to update channel allocation throughout the wireless system.

In a second embodiment of illustrative method 200a, the tentative channel assignments determined in operation 204 are obtained according to a time schedule (e.g., hourly, daily, etc.) that is intended to capture substantial changes in call demand. Such channel assignments are then used as a basis for a conventional DCA routine that updates channel allocations on a substantially continuous basis, as indicated in operation 205. Therefore, the conventional DCA routine does not process large swings in call demand that are handled instead by the present channel allocation method. Such an approach should result in more efficient channel allocation.

Figure 1:
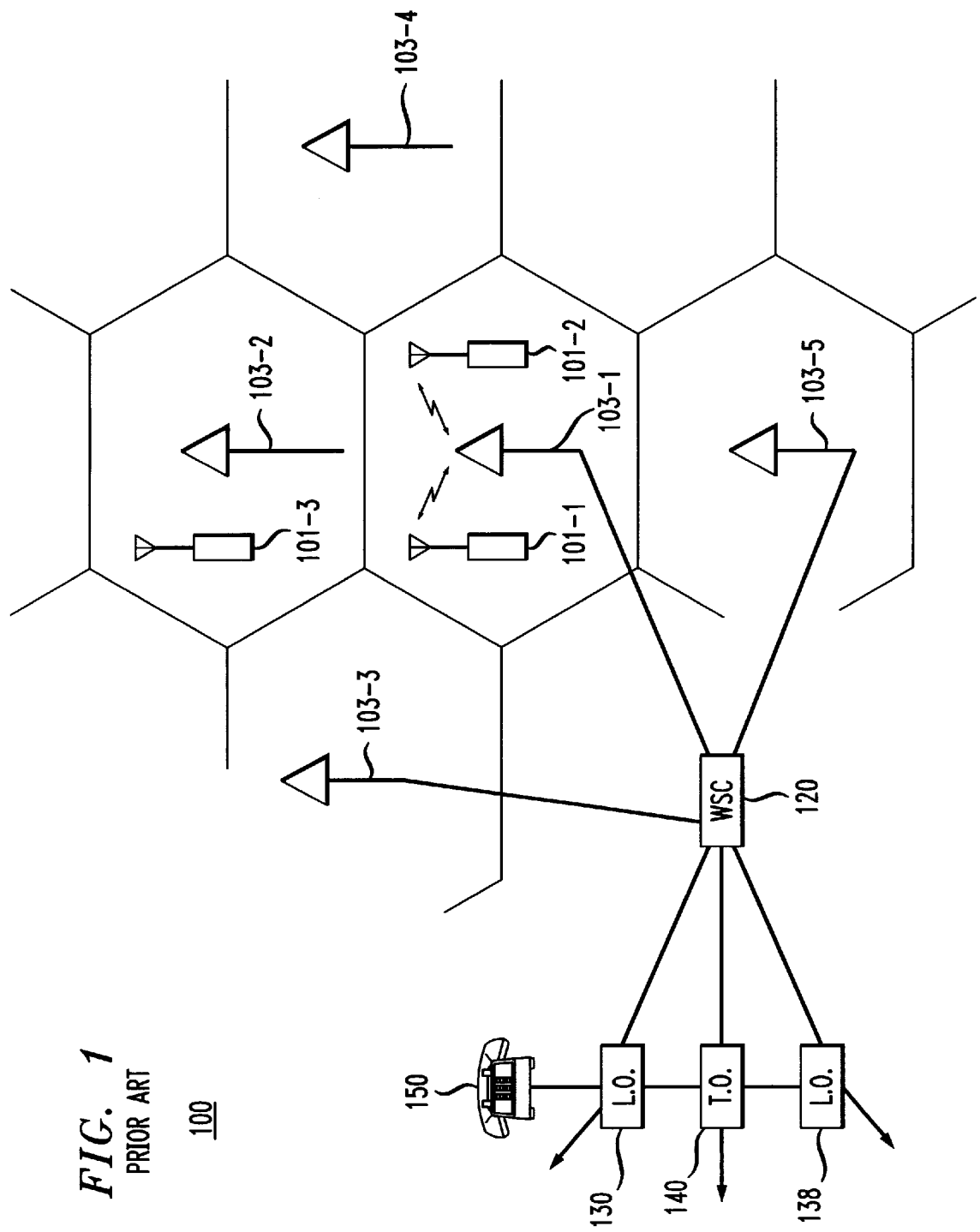
FIG. 1 depicts a schematic of a prior art wireless communications system.

The channel assignment or allocation operation, as practiced in accordance with the present teachings, is based on a wireless telecommunications system having a plurality of cells arranged in the usual hexagonal grid topology illustrated in FIG. 1. Any allocation of channels among cells in a system must not assign the same frequencies to a pair of interfering cells (more properly, base stations). For the purposes of the present Specification, two cells are considered to "interfere" if they are close enough to interfere with each other when using the same carrier frequency (i.e., channel) for wireless communication. In a first embodiment, described in Section I below, channels are allocated assuming that only nearest (i.e., adjacent) cells interfere. In a second embodiment, described in Section II below, channels are allocated assuming that nearest- and next-to-nearest cells interfere.

Section I—Channel Allocation for Nearest-Cell Interference

Figure 3:
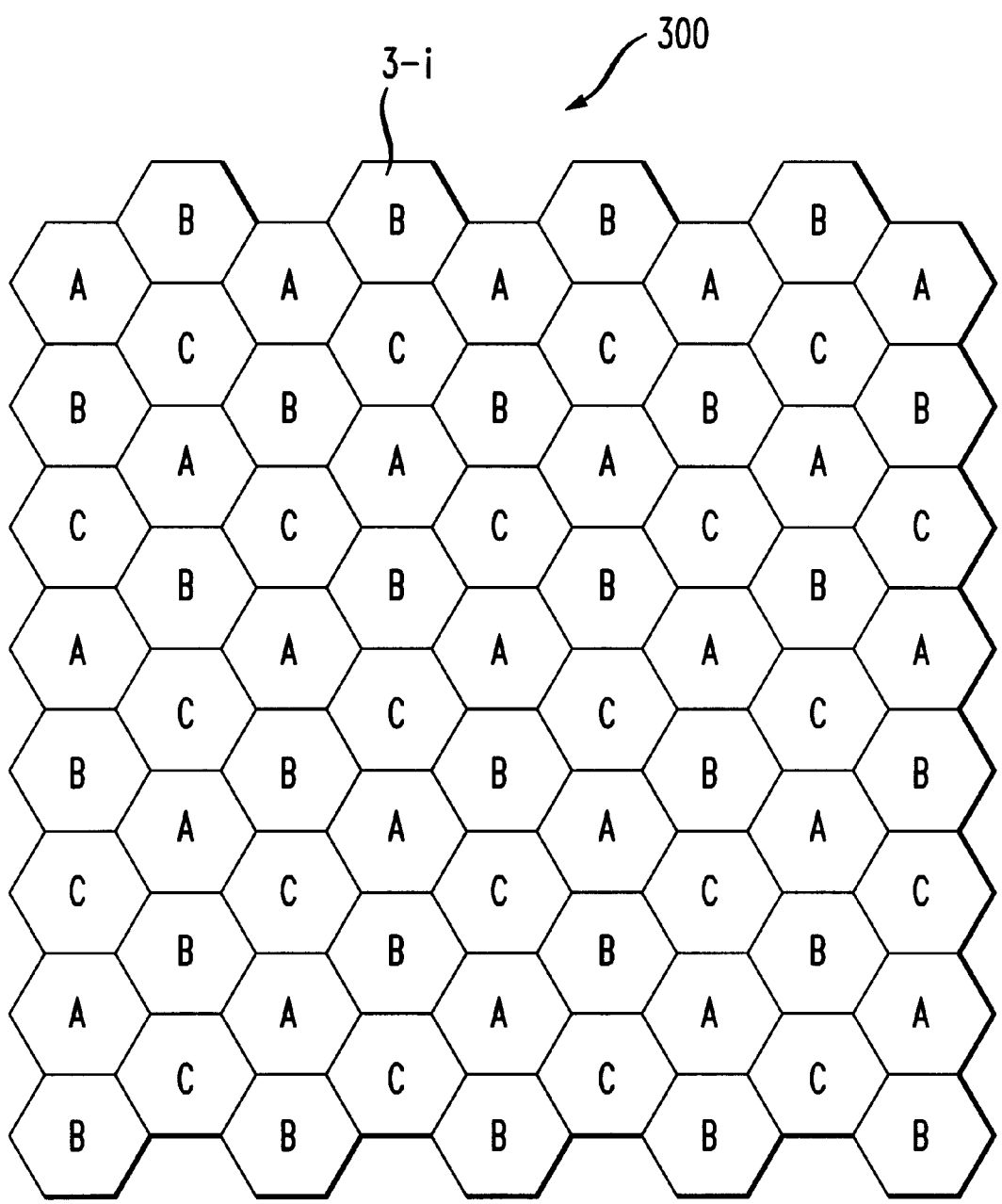
FIG. 3 depicts a wireless telecommunications system and the allocation of three communications channels to the cells therein.

FIG. 3 depicts cells 3-i, i=1, n, arranged in the usual hexagonal topology, which comprise a portion of a wireless telecommunications system 300. FIG. 3 shows that when only nearest cells interfere, three channels A, B and C (i.e., carrier frequencies) must be used to satisfy a "unit" of channel demand in each cell 3-i such that no two interfering cells are assigned the same channel. The channel assignment depicted in FIG. 3 is arbitrary; it will be appreciated that several other assignments are possible.

Figure 4:
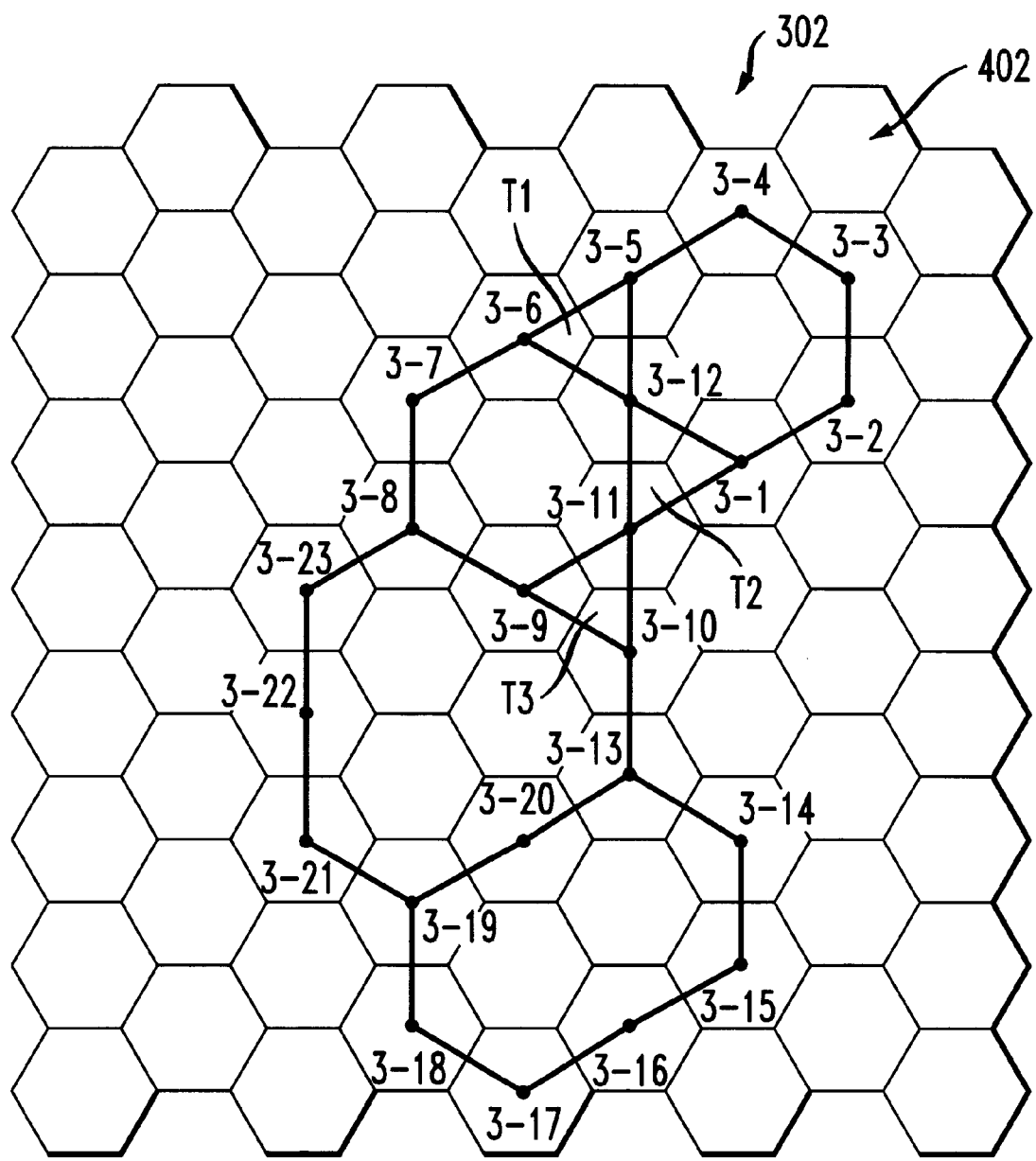
FIG. 4 depicts cells in a wireless telecommunications system having a non-zero channel demand and an interference graph defined by such cells.

FIG. 4 depicts cells 3-1 through 3-23 of illustrative wireless telecommunications system 302. Cells 3-1 through 3-23 have a non-zero channel demand D1 through D23, respectively. Unlabelled cells have zero channel demand and are ignored when applying the present method. Three triangularly-shaped "cliques" ("triangles") T1, T2 and T3 occur within an "interference graph" 402 of system 302. An "interference graph" is defined by placing a "point" at the center of each cell having a non-zero channel demand and then connecting such centrally-located points of interfering cells. The term "clique" refers to a group of mutually-interfering cells. For the case of nearest-cell interference, clique size is a maximum of three (i.e., no more than three cells can mutually interfere with one another), and such three-membered cliques are triangularly shaped. Thus, triangles T1, T2 and T3 are cliques having three members. All other cliques shown in interference graph 402 have two members. For example, cells 3-4 and 3-5 form a two-membered clique, as do cells 3-4 and 3-3. The cells 3-3, 3-4 and 3-5 do not form a single three-membered clique because, for the present case of nearest-cell interference, cells 3-4 and 3-6 do not interfere with one another. It will be appreciated that in a typical wireless telecommunications system, there will be many such cliques.

Figure 5:
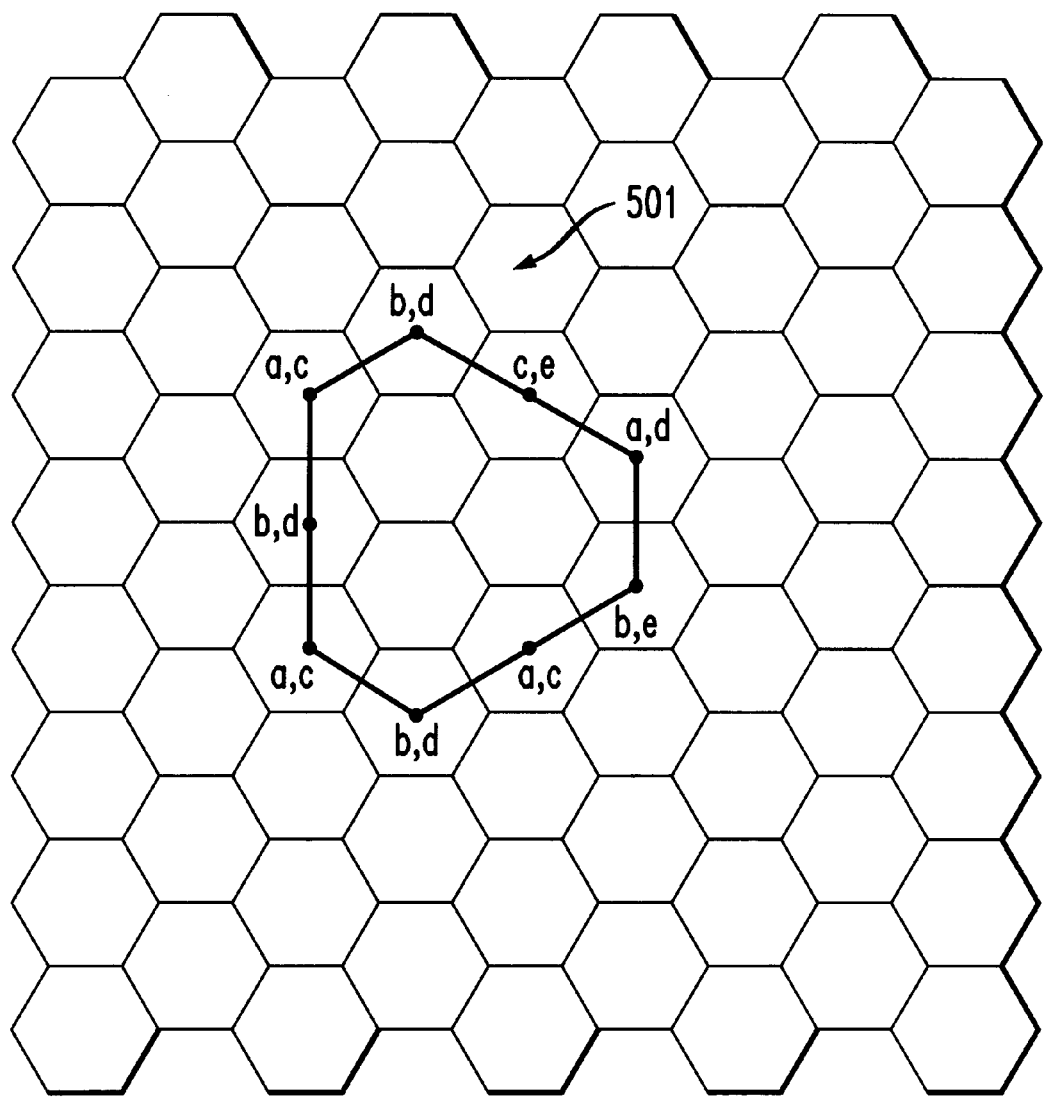
FIG. 5 depicts a cycle of an interference graph wherein five channels are allocated to satisfy a channel demand of two.
Figure 6:
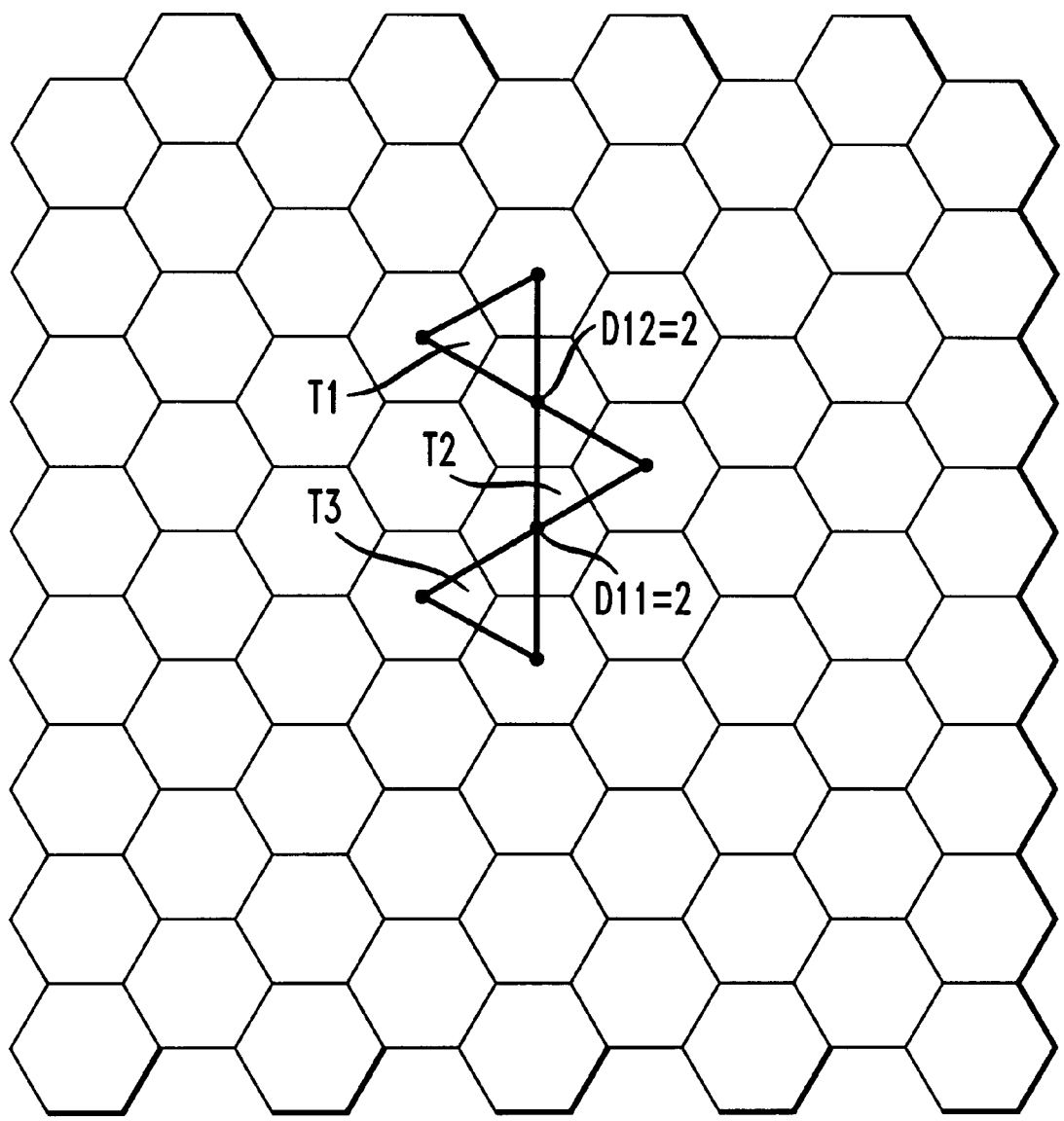
FIG. 6 depicts three-membered cliques from the interference graph of FIG. 4.

The present inventors have discovered that a maximum of five communication channels is required to satisfy a channel demand of two, system-wide, for "triangle-free" interference graphs. In other words, given an arbitrary cycle having a maximum clique size of two, such as cycle 501 depicted in FIG. 5, a maximum of five channels is used cycle-wide to reduce the channel demand at each cell by two while no two interfering cells are assigned the same channel. Using cycle 501 as an example, channels A–E are assigned, two to each cell, such that no interfering (i.e., adjacent) cells are assigned the same channels. A methodology for such assignment is described later in this Specification.

Figure 2B:
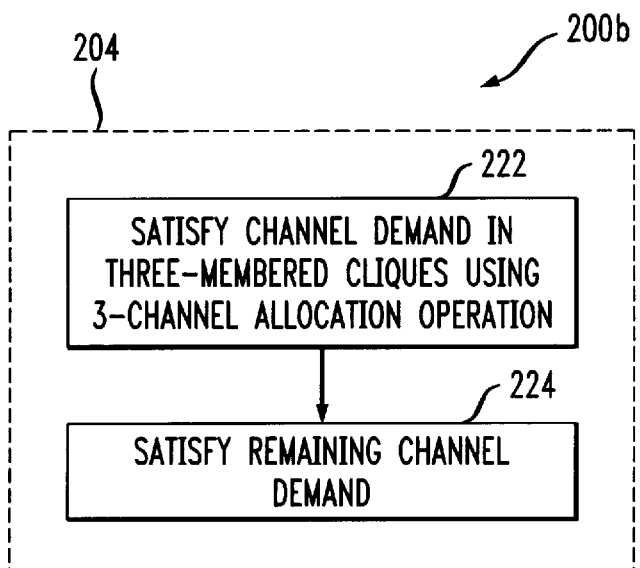
FIG. 2b depicts a method for channel allocation when nearest-cell interference is considered.

Thus, while three channels must be allocated or assigned to satisfy a demand of one ("three-channel-allocation operation") in three-membered cliques, assigning a maximum of five channels satisfies a demand of two ("five-channel-allocation operation") in cycles having a maximum clique size of two. Five-channel-allocation is clearly more efficient than three-channel-allocation, but cannot be used if three-membered cliques are present. In accordance with the present teachings, all three-membered cliques are first "removed" from the interference graph of a system using a three-channel-allocation operation, and, once removed, a five-channel-allocation operation is used to satisfy the remaining channel demand. Thus, for nearest-cell interference, the present method advantageously uses both three- and five-channel-allocation operations, which results in more efficient channel allocation than if the three-channel-allocation operation is used alone. FIG. 2b depicts a flow diagram of a method 200b for channel allocation considering only nearest-cell interference.

In operation 222, three-membered groups (i.e., cliques or triangles) of mutually-interfering cells are "removed" from an interference graph of the system by iteratively assigning three channels, one to each cell in the interference graph, until channel demand in at least one of the cells in each triangle is completely satisfied. When the channel demand of a cell is completely satisfied, it "disappears" from the interference graph. Thus, at the completion of operation 222, no triangles remain in the interference graph.

Figure 7:
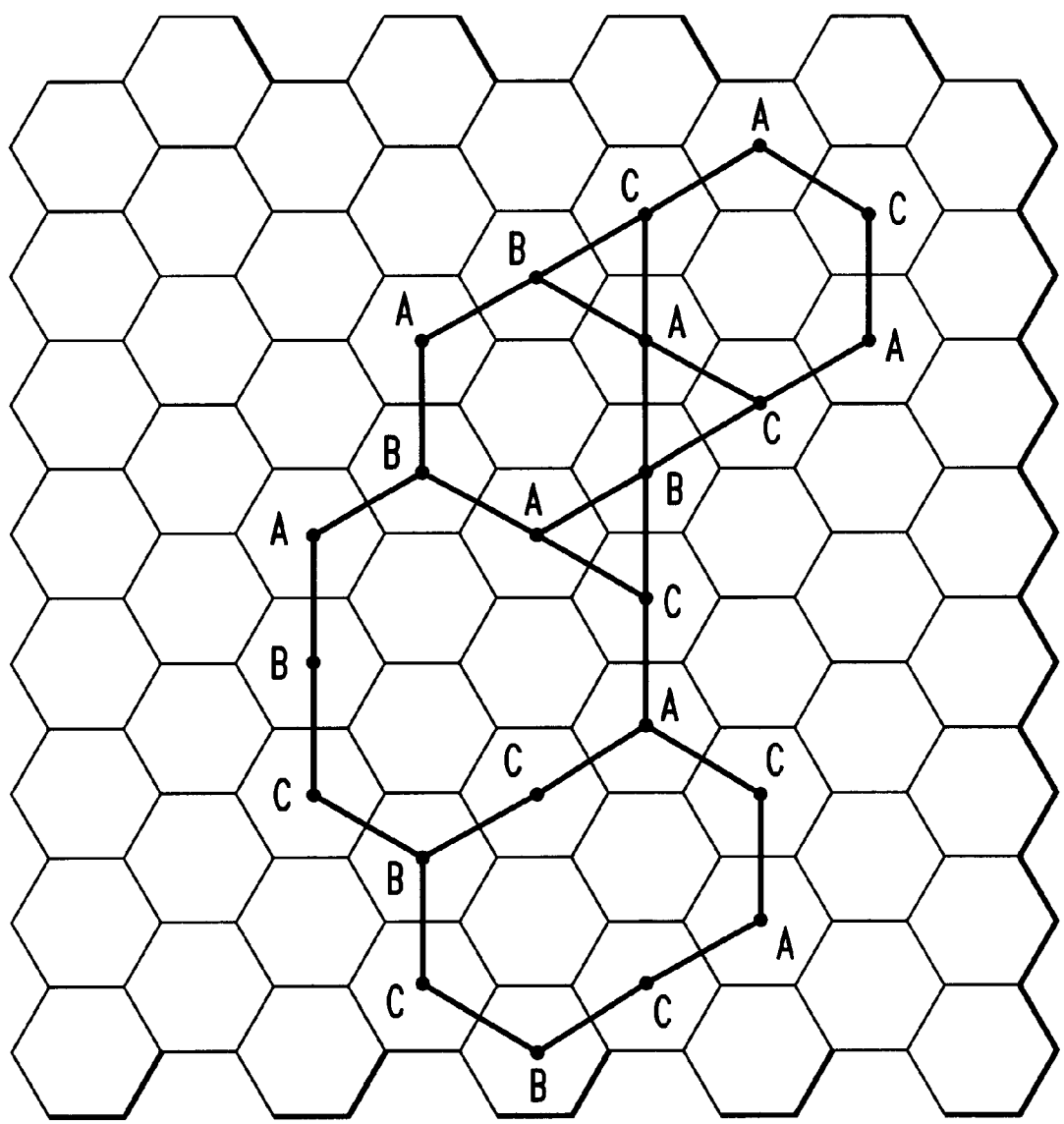
FIG. 7 depicts the allocation of three channels to satisfy a channel demand of one in the interference graph of FIG. 4.

As an illustration of operation 222, triangles T1–T3 of FIG. 4 are removed by assigning channels A–C to all cells in the interference graph during a first iteration, and channels D–F to all such cells during a second iteration, as depicted in FIGS. 6–9. The triangles of interference graph 402 shown in FIG. 3 are depicted alone, for clarity, in FIG. 6. For the present example, the following channel demands are assumed: D11 and D12=2, and the demand for all other cells is 4. Thus, in a first iteration, the first three channels A–C are assigned to all cells as shown in FIG. 7. Such assignment or allocation is implemented in the manner illustrated in FIG. 3. As a result of such assignment, channel demand is reduced by one in each of the cells in the wireless system. Thus, at the end of the first iteration, the remaining unsatisfied channel demand in cells D12 and D11 in triangles T1–T3 is one.

Figure 8:
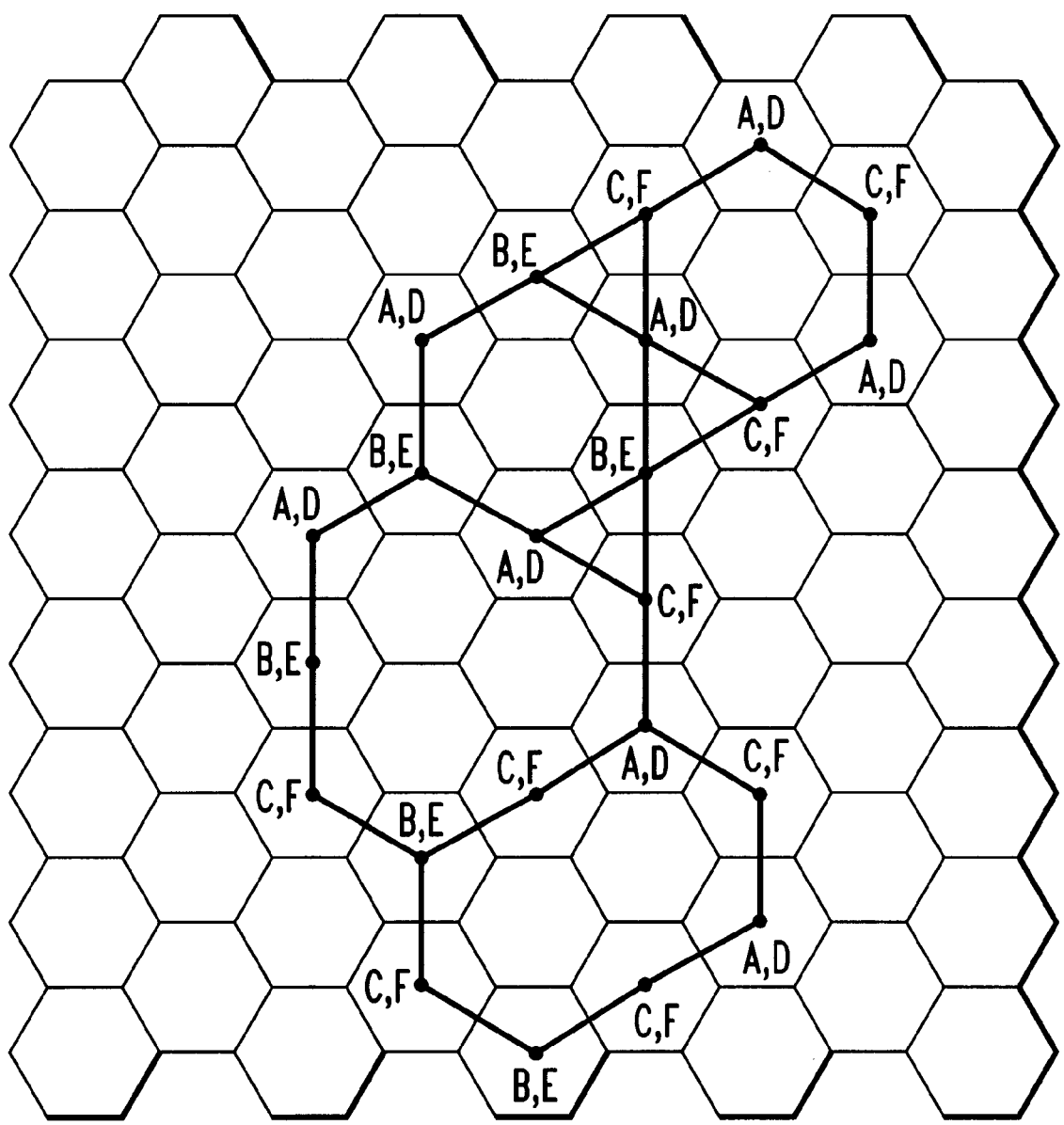
FIG. 8 depicts the allocation of six channels to satisfy a channel demand of two in the interference graph of FIG. 4.
Figure 9:
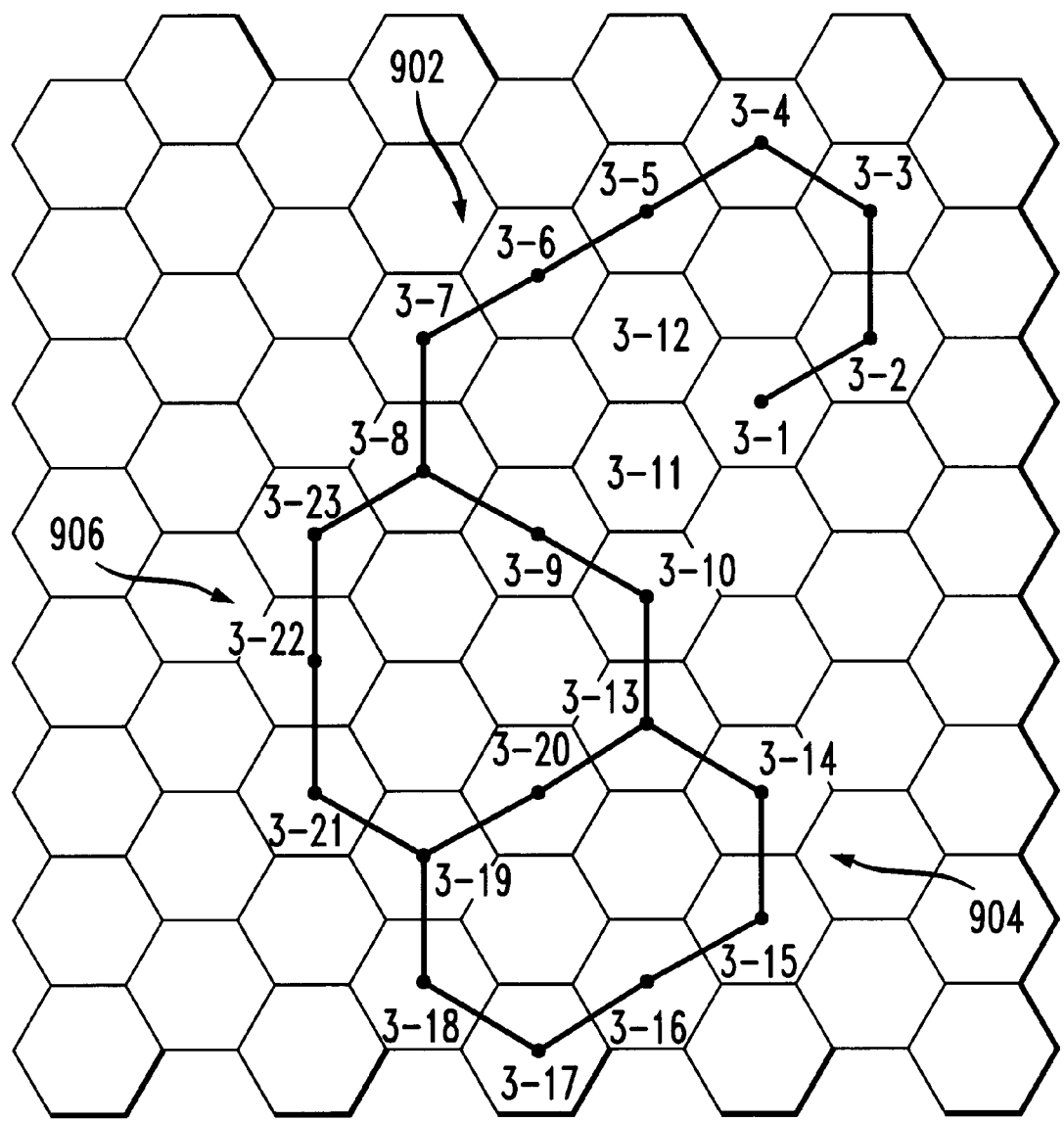
FIG. 9 depicts the interference graph of FIG. 4 after three-membered cliques are removed in accordance with the present teachings.

The result of a second iteration, wherein the next three channels D–F are allocated to each cell in the system, is depicted in FIG. 8. When selecting subsequent channels for allocation, the lowest (in numerical sequence) available channels are selected. For example, if channels having carrier frequencies of 1.025, 1.050, 1.075, 2.000, 2.025 and 2.050 MHz are available after allocating the first three channels, the channels having carrier frequencies of 1.025, 1.050 and 1.075 MHz should be assigned next.

Channel allocation is implemented as follows. Cells that were assigned channel A during the first iteration are assigned channel D during the second iteration. Cells that were assigned channel B during the first iteration are assigned channel E during the second iteration, and cells that were assigned channel C during the first iteration are assigned channel F during the second iteration. Again, assignment of the three channels reduces channel demand by one at each cell. Since the unsatisfied channel demand in cells D12 and D11 is one, that demand is fully satisfied by the second iteration. Thus, as a result of the allocating channels D–F during the second iteration, cells 3-12 and 3-11 "drop out" of the interference graph and triangles T1, T2 and T3 do likewise, resulting in the triangle-free interference graph depicted in FIG. 9. Note that if one or both of the cells 3-12 and 3-11 had a channel demand greater than two, then additional iterations, and additional channels (three for each iteration) would be required to fully satisfy their channel demand and remove the triangles from the interference graph.

Figure 2C:
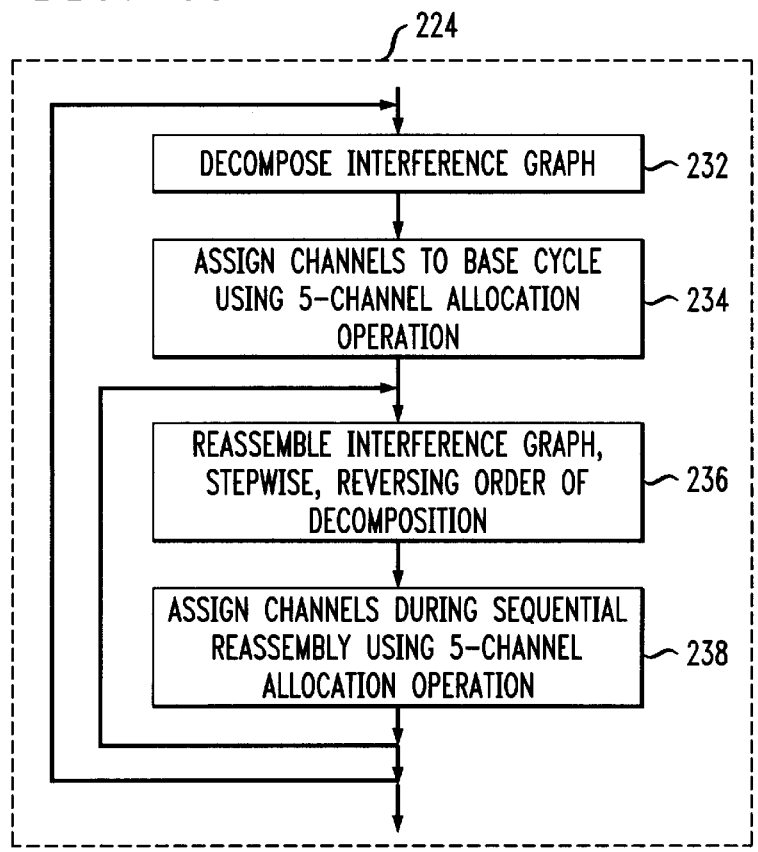
FIG. 2c depicts steps in one of the operations of the method of FIG. 2b.

In a second operation 224 of method 200b (FIG. 2b), the channel demand of the remaining cells (connected in a triangle-free interference graph) is iteratively satisfied. Second operation 224 is performed, in some embodiments, in accordance with steps depicted in FIG. 2c. In step 232, the triangle-free interference graph is "decomposed" by removing portions thereof until a single "base" cycle, such as cycle 501 shown in FIG. 5 (though the number of cells and/or their relative positions can be different than in cycle 501), remains. The decomposition process involves removing "chains" and "ears" from the interference graph A "chain" is a grouping of cells attached to the rest of an interference graph at one end-point (i.e., one cell). For example, in FIG. 9, cells 3-1 through 3-7 define a chain 902. Cell 3-7 is the end-point at which chain 902 is attached to the rest of interference graph 402. An "ear" is a grouping of cells attached to the rest of a graph at both of its end-points (possibly to the same cell). For example, referring again to FIG. 9, cells 3-14 through 3-18 define an ear 904. Cells 3-14 and 3-18 are the end-points of ear 904. After removing chain 902 and ear 904 from interference graph 402, base cycle 906 defined by cells 3-8, 3-9, 3-10, 3-13, 3-20, 3-19, 3-21, 3-22 and 3-23 remains In step 234, channels are first assigned to base cycle 906. Such channel assignment is depicted, sequentially, in FIGS. 10a through 10f. The present description continues assuming that a channel demand of two exists in each of the remaining cells (i.e., in cycle 906, ear 904 and chain 902), recalling that two units of demand have already been satisfied during the assignment of channels A–F during the removal of triangles T1–T3. It was previously described that once the interference graph is triangle free such that the remaining graph has a maximum clique size of two, a maximum of five channels is used to satisfy a channel demand of two. In the present illustration, all triangles T1–T3 have been removed such that now, in second operation 224, channel demand can be satisfied in a more efficient manner than during the first operation. In FIGS. 10a–10f, the next five available channels in the spectrum band, assumed to be channels G–K, are assigned to satisfy the remaining channel demand of two for each cell.

Figure 10A:
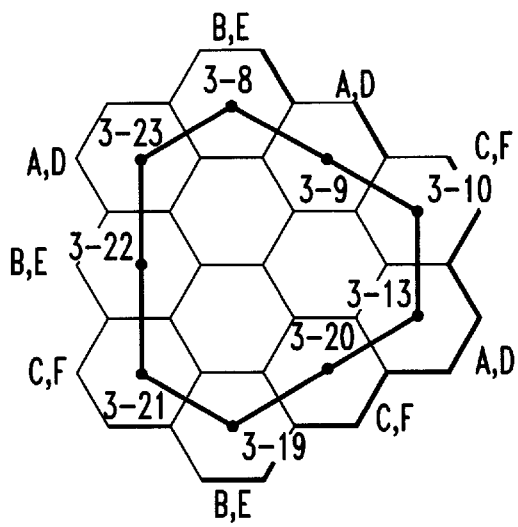
FIG. 10a depicts a cycle from the interference graph of FIG. 4 after two units of channel demand is satisfied.
Figure 10B:
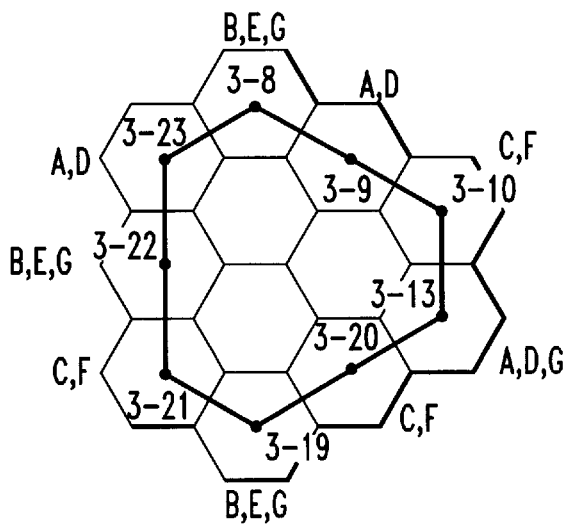
FIGS. 10b–10f depict the assignment of five channels to the cells in the cycle of FIG. 10a to satisfy two units of channel demand.

FIG. 10a depicts the channel assignments to the cells of base cycle 906 after first operation 222 is completed and before any remaining channel demand is satisfied during second operation 224. FIG. 10b depicts the process of assigning channel G to base cycle 906. For the assignment process, a cell is picked, arbitrarily, as the starting point. In FIG. 10b, cell 3-13 is such a starting point. Thus, channel G is assigned to cell 3-13, and to every second cell thereafter in base cycle 906 unless doing so would result in assigning channel G to adjacent cells. In particular, after cell 3-13, channel G is assigned to cell 3-19, 3-22 and 3-8. Channel G is not assigned to the cell 3-10, which is the second cell after 3-8, because such assignment would conflict with the assignment of channel G to cell 3-13. As such, channel G cannot be assigned to any further cells in base cycle 906.

Figure 10C:
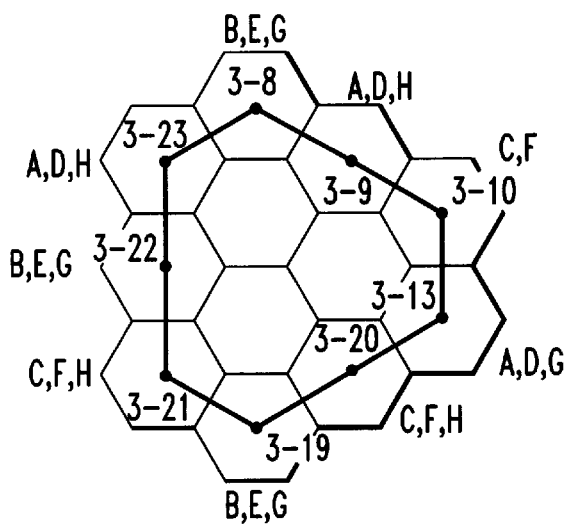
Figure 10D:
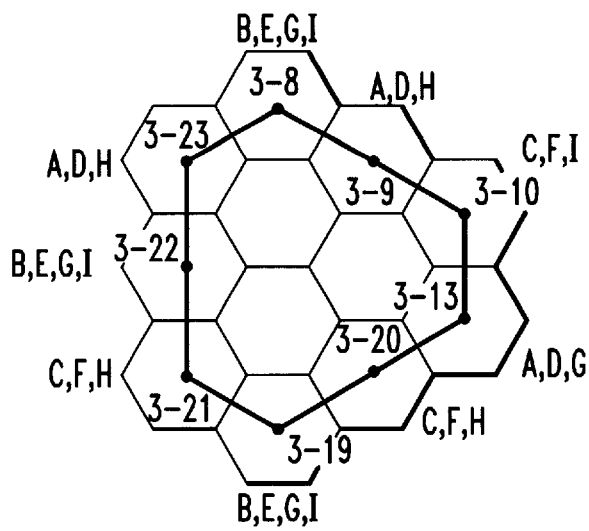

Referring to FIG. 10c, channel H, the next channel in the sequence of channels, is assigned to the cell following cell 3-13, which is cell 3-20. In the present embodiment, cell 3-13 is considered to be the cell that follows cell 3-13 since, when channel G was assigned, assignment proceeded in a clockwise direction. In another embodiment, assignment proceeds counterclockwise such that the assignment of channel H would begin with cell 3-10. Channel H is thus assigned to cell 3-20 and every second cell thereafter in base cycle 906 unless doing so would result in assigning channel G to adjacent cells. Thus, channel H is assigned, as shown in FIG. 10c, to cells 3-21, 3-23 and 3-9. Channel H cannot be assigned to any other cells in cycle 906. Channel assignment therefore continues with channel I, as depicted in FIG. 10d.

Figure 10E:
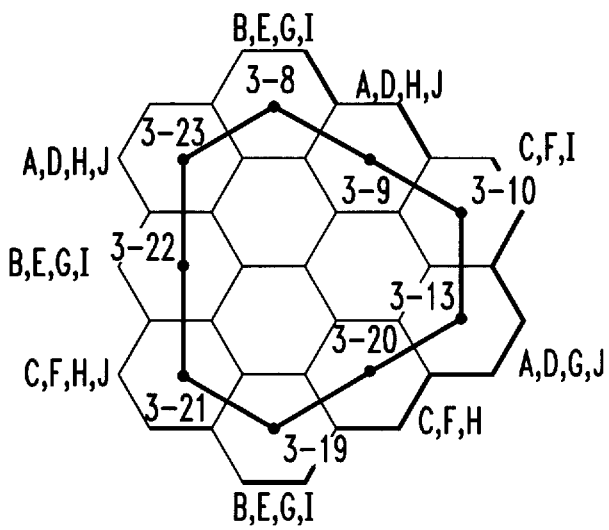
Figure 10F:
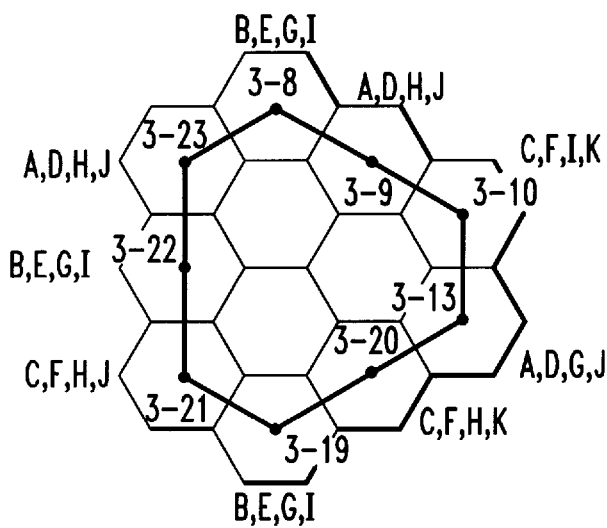

Channel assignment continues with the cell after 3-20, which, in the present embodiment, is cell 3-19. Channel I is thus assigned to cell 3-19, 3-22, 3-8 and 3-10. FIG 10e depicts the assignment of channel J to cells 3-21, 3-23 3-9 and 3-13. The last of the five channels, channel K, is assigned to cells 3-10 and 3-20, as depicted in FIG. 10f. Thus, the channel demand of the cells in base cycle 906 is completely satisfied with the assignment of four channels to each cell, wherein, within a given cell and the cells adjacent to it, there is no channel that is assigned more than once.

In accordance with step 236, the interference graph is reassembled, stepwise, by adding back the ear or chain that was last removed, and then assigning channels to it, as per step 238. In the present example based on interference graph 402 of FIG. 9, it is inconsequential which of chain 902 or ear 904 is first removed or first added back for channel assignment. It should be recognized that such an example is greatly simplified for clarity and brevity. In a typical wireless communications system, there will be many more cells having a channel demand than in the present example. The interference graph for such a system will thus be considerably more complex than in the example. Such a graph will typically have many nested "ears" wherein removal and re-attachment of such ears must proceed in a defined order. In the present example, ear 904 is assumed to be the last portion of the graph removed and, therefore, is the first portion to be added back. FIGS. 11a–11f depict the process of adding back ear 904 and assigning channels to it.

Figure 11A:
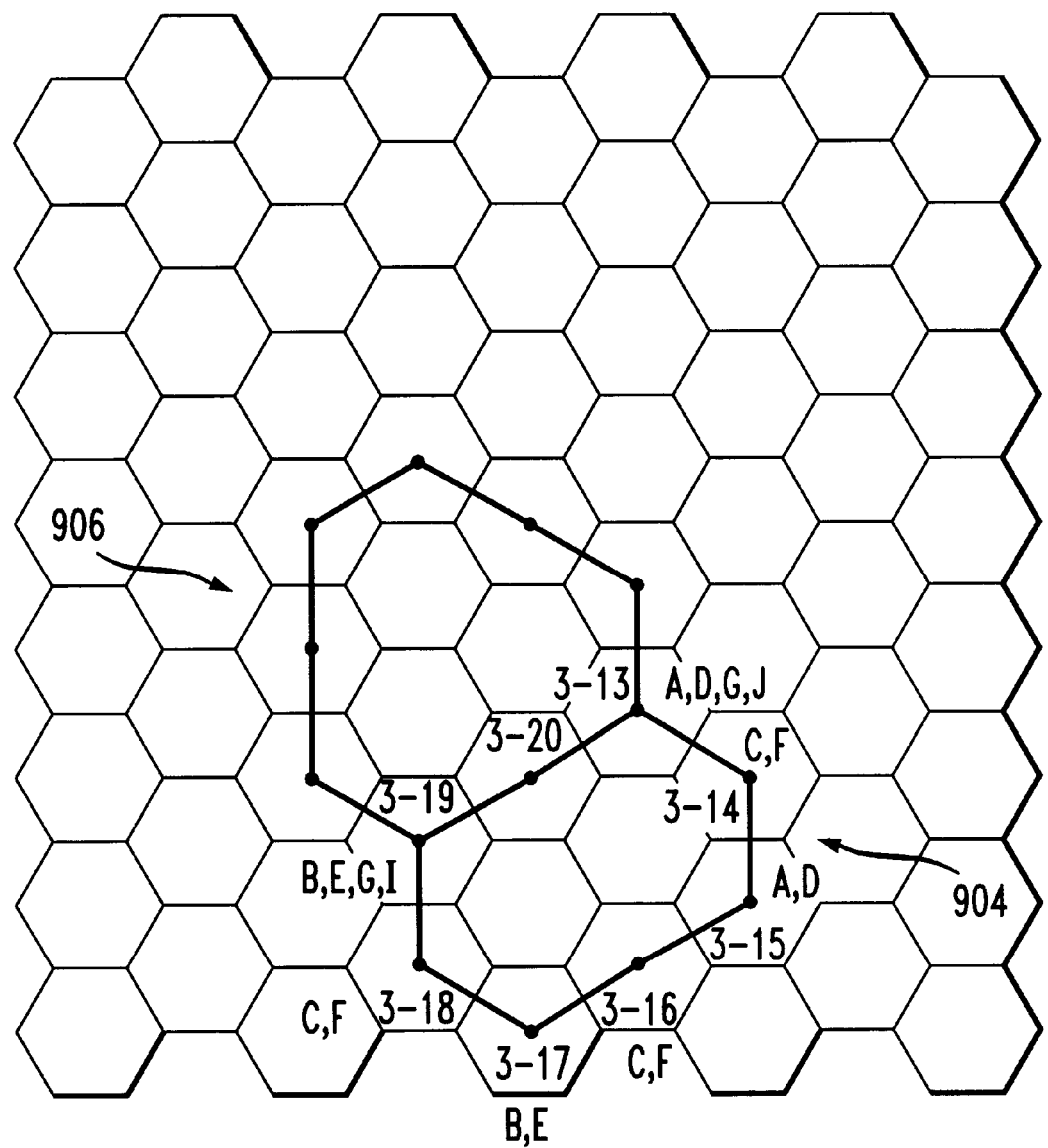

FIG. 11a shows ear 904 "reattached" to base cycle 906 before assigning any additional channels. The two channels previously assigned (i.e., during operation 222) to each cell in ear 904 are indicated in FIG. 11a, along with the channel assignment of cells 3-19 and 3-13 of base cycle 906. It will be appreciated that since cells 3-19 and 3-13 are adjacent to respective end-points 3-18 and 3-14 of ear 904, the channel assignments at cells 3-19 and 3-13 dictate channel assignments within ear 904.

Note that the first iteration of second operation 224 is not complete until two units (i.e., channels) of demand are satisfied throughout the complete interference graph (as it exists after triangle removal in operation 222). In other words, the process of assigning channels to ear 904, and, subsequently, chain 902, are both included in the first iteration that began with the assignment of channels G–K to base cycle 906. Thus, channels G–K are assigned to ear 904, and chain 902 after that.

Figure 11B:
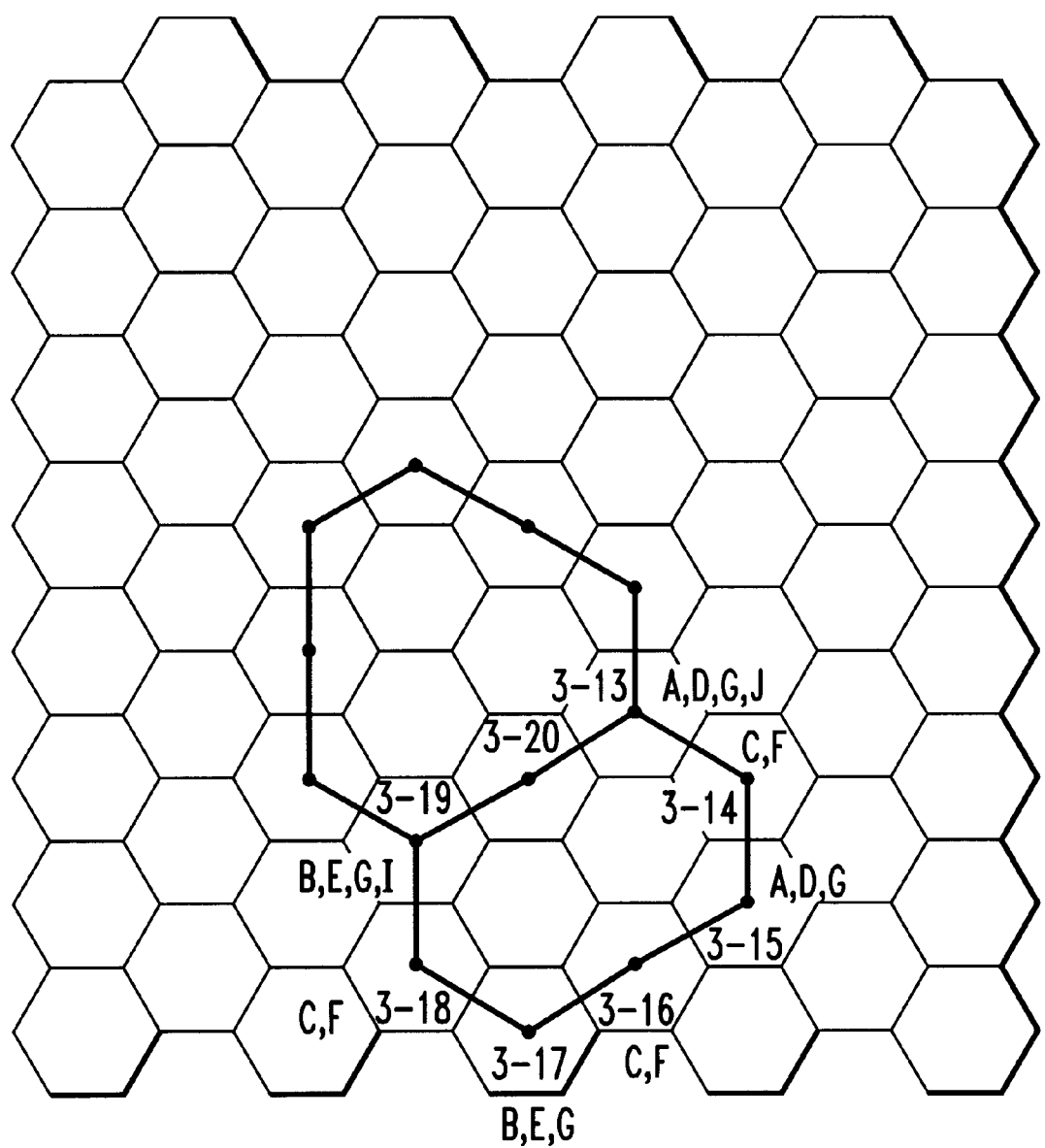
FIGS. 11b–11f depict the assignment of five channels to the cells of the ear of FIG. 11a to satisfy two units of channel demand.
Figure 11C:
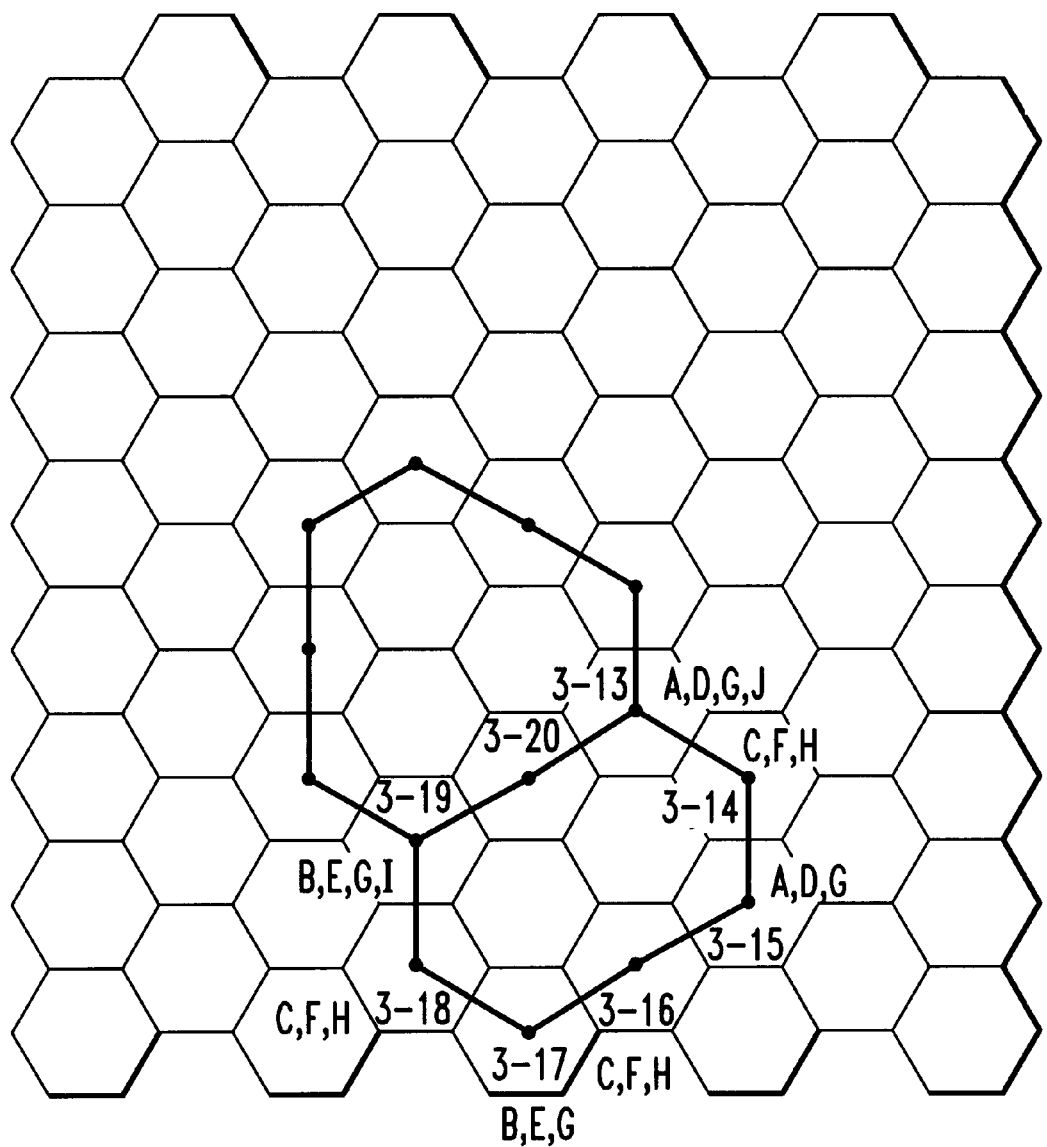
Figure 11D:
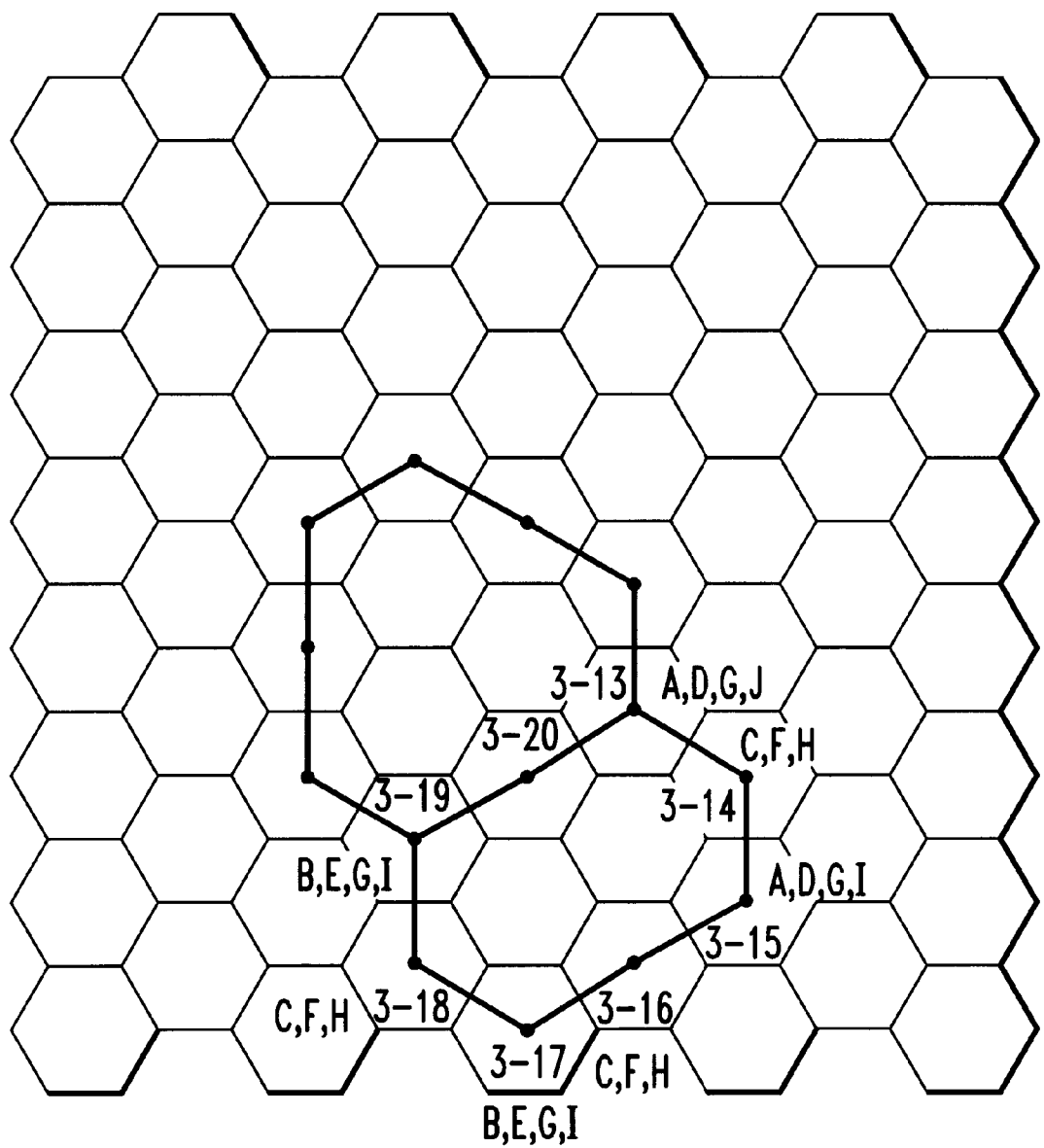
Figure 11E:
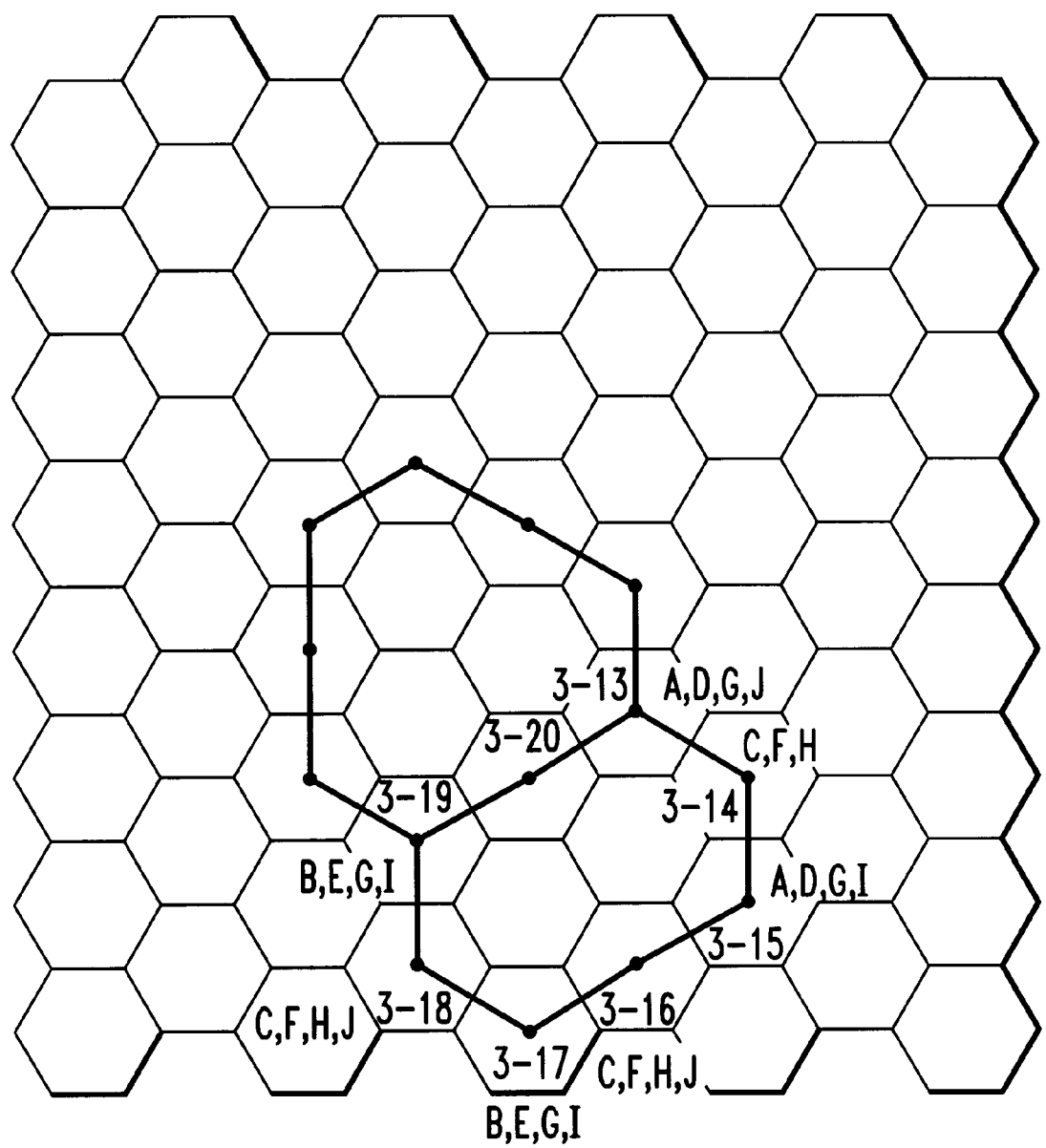
Figure 11F:
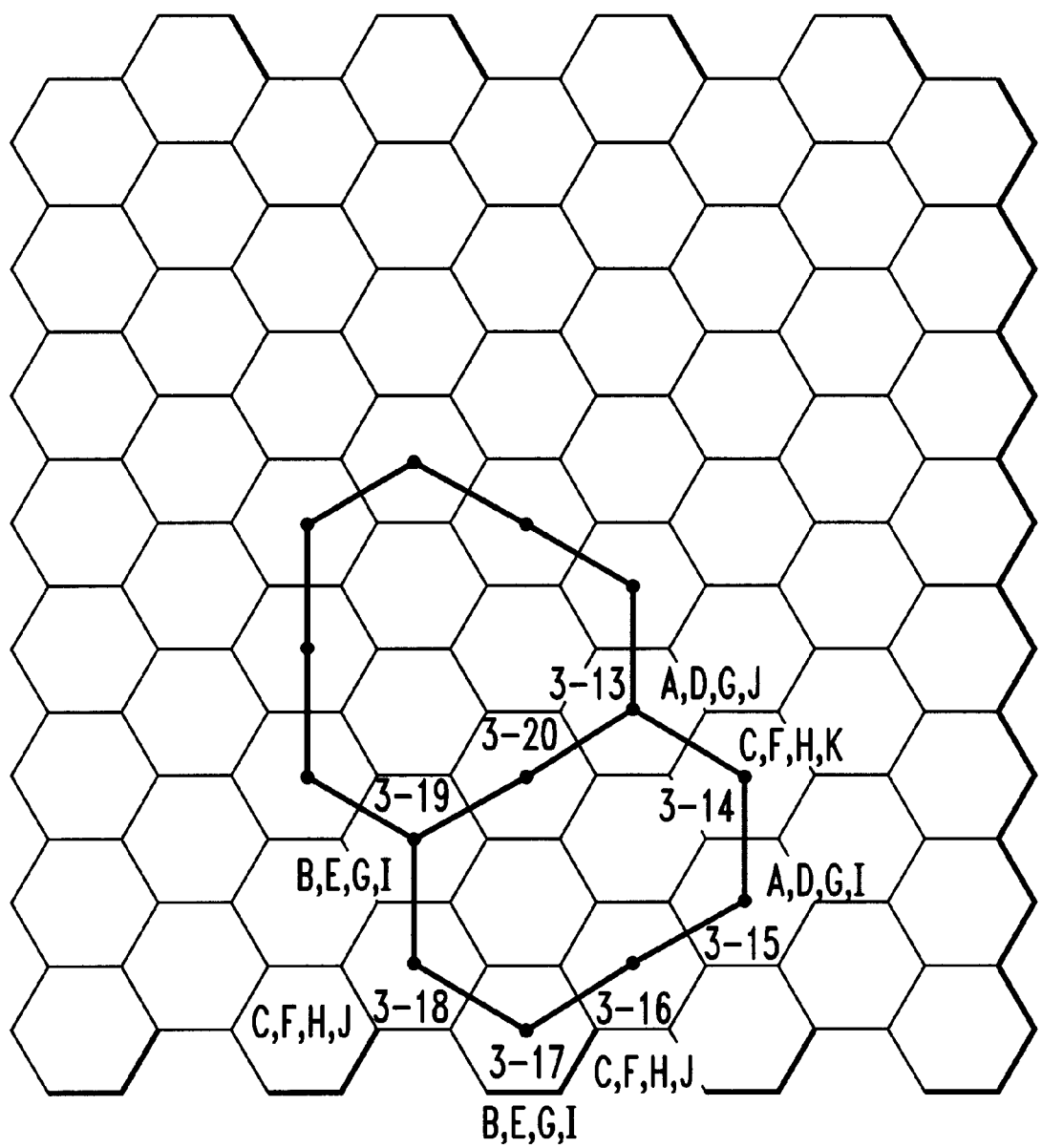

FIG. 11b depicts the assignment of channel G to the cells in ear 904. Again, channels are assigned in a clockwise manner beginning at the end-point of the ear (i.e., cell 3-14) following cell 3-13. Note that such clockwise assignment is not dictated by the clockwise pattern adopted for channel assignment in base cycle 906; the choice of assignment direction is again arbitrary. Since channel G is assigned to cell 3-13 of base cycle 906, it cannot be assigned to adjacent cell 3-14 in ear 904. Channel G is assigned instead to cell 3-15 and 3-17. FIG. 11c depicts the assignment of channel H to the cells in ear 904. Channel H is assigned to cell 3-14, and every second cell thereafter, such as cells 3-16 and 3-18. The assignment of channel I is shown in FIG. 11d. Channel I is assigned to cells 3-15 and 3-17. FIG. 11e depicts the assignment of channel J. Since channel J cannot be assigned to cell 3-14 since it was assigned to cell 3-13 in base cycle 906, and since the full channel demand of cell 3-15 has been satisfied with the assignment of channel I (FIG. 11d), channel J is assigned first to cell 3-16 and then to cell 3-18. Only one unit of unsatisfied channel demand remains. That unit of demand is satisfied by assigning channel K to cell 3-14, as shown in FIG. 11f.

Having satisfied two units of channel demand in ear 904 by assigning 5 channels to the cells therein, chain 902 is "re-attached" to base cycle 906 and channels G–K are assigned thereto. Note that based on the original channel demand of four in the cells comprising base cycle 906 and ear 904, which is reduced to two after first operation 222, a single iteration during operation 224 is sufficient to satisfy the full channel demand in both of such portions. Even if the full channel demand in base cycle 906 or ear 904 was not satisfied after the allocation of five channels to the cells therein, the present method for channel assignment continues with the re-attachment of the appropriate portion (i.e., ear 904, or chain 902 if channels have already been assigned to ear 904) and the allocation of channels thereto. For the present example wherein the interference graph at the start of second operation 224 includes base cycle 906, single ear 904 and single chain 902, the first iteration of second operation 224 ends after the same five channels (in this case, channels G–K) have been assigned, as necessary, to the cells in base cycle 906, ear 904 and chain 902. If the full demand has not been satisfied when the first iteration of operation 224 is complete, then a second iteration is employed wherein the graph is decomposed to access the portion with the unsatisfied demand, and the next group of five channels are allotted as necessary, to satisfy the remaining demand.

Figure 12A:
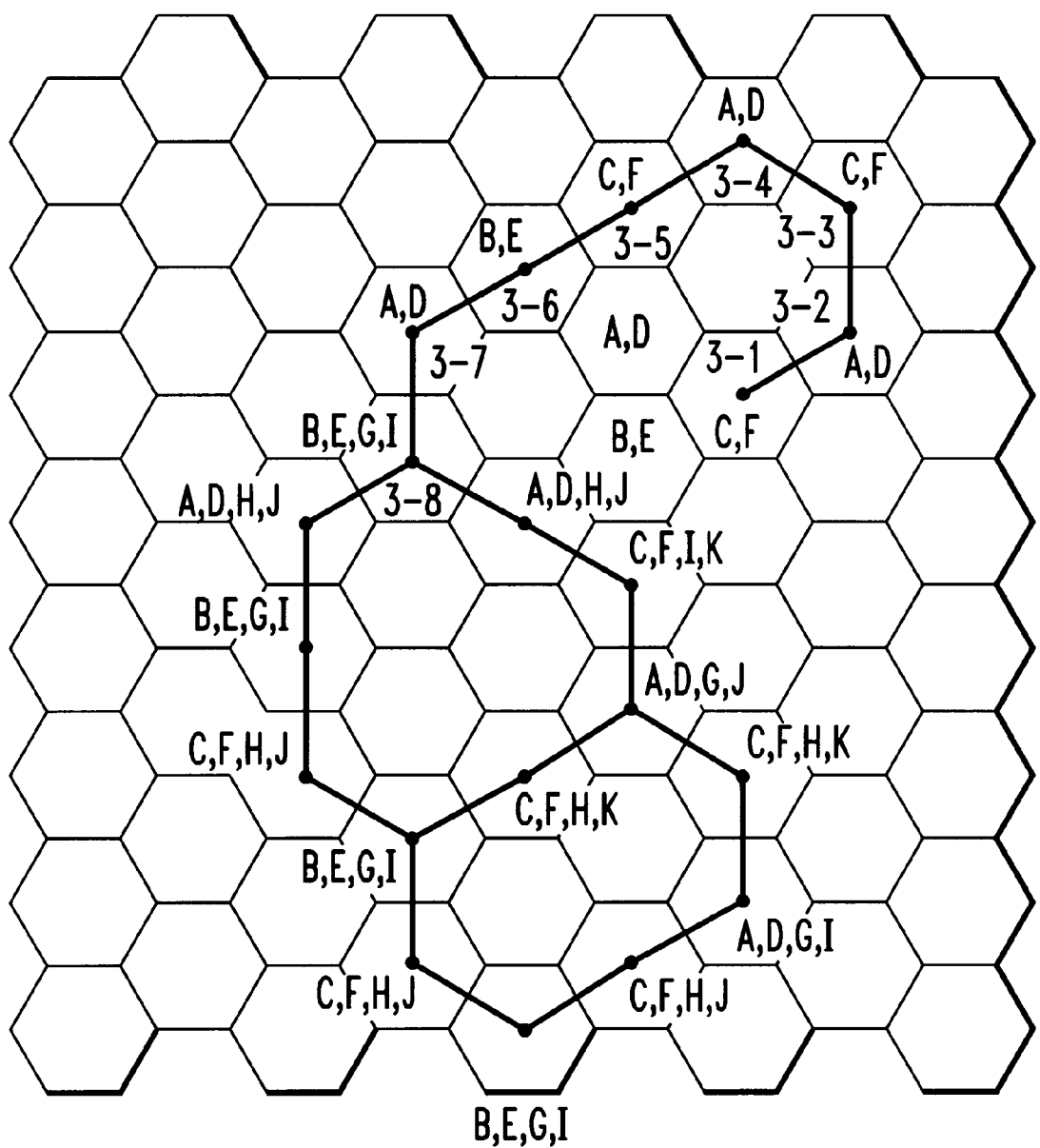

FIG. 12a shows base cycle 906 and ear 904 of the interference graph with their four units of channel demand fully satisfied by the assignment of four channels. FIG. 12a further depicts chain 902 re-attached, and identifies the channels previously assigned to the cells therein. Two units of demand remain to be satisfied in chain 902. Since, as previously described, the first iteration is not yet complete, channels G–K are available for assignment.

Figure 12B:
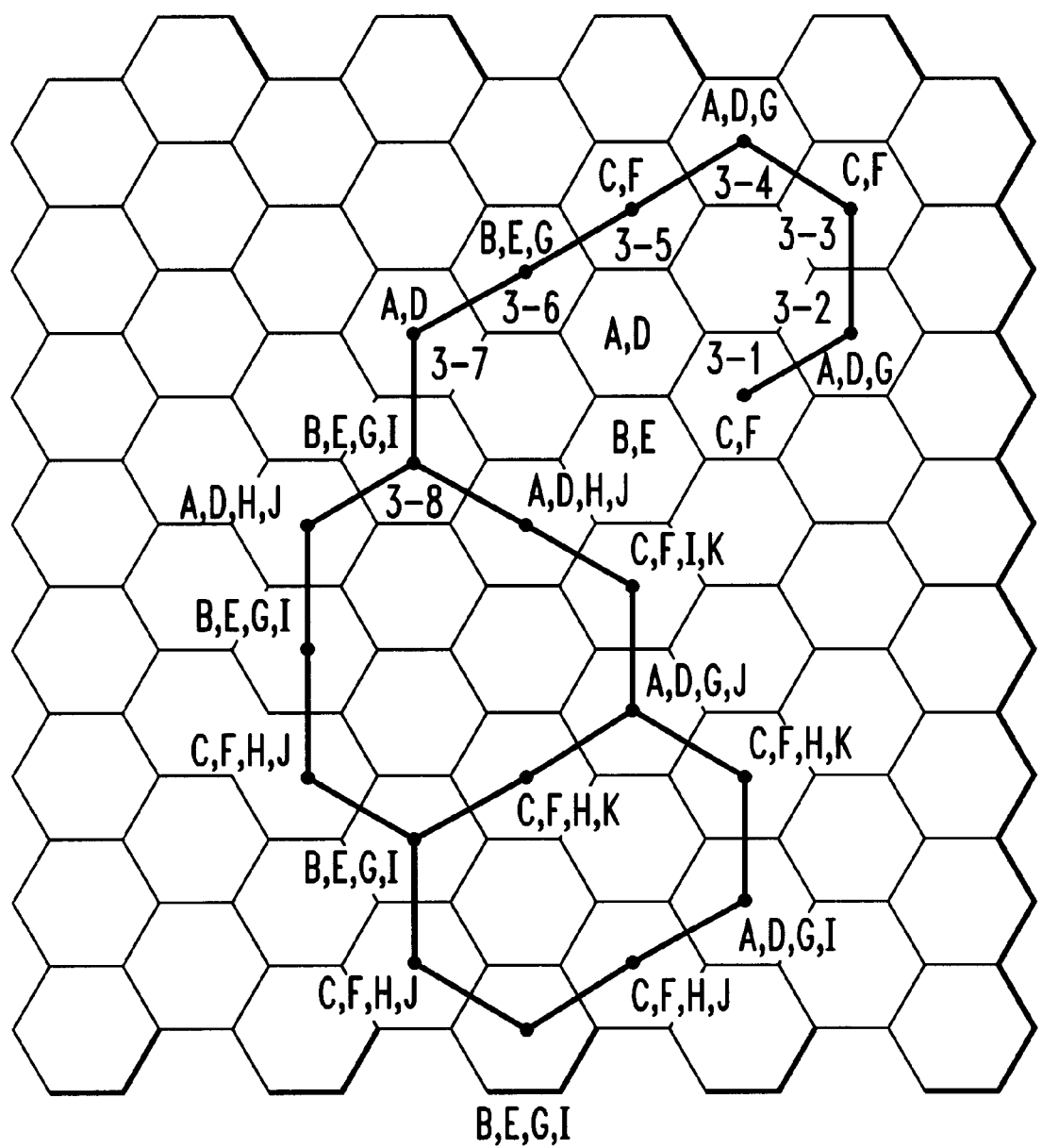
FIGS. 12b–12e depict the assignment of four channels to the cells of the chain of FIG. 12a to satisfy two units of channel demand.
Figure 12C:
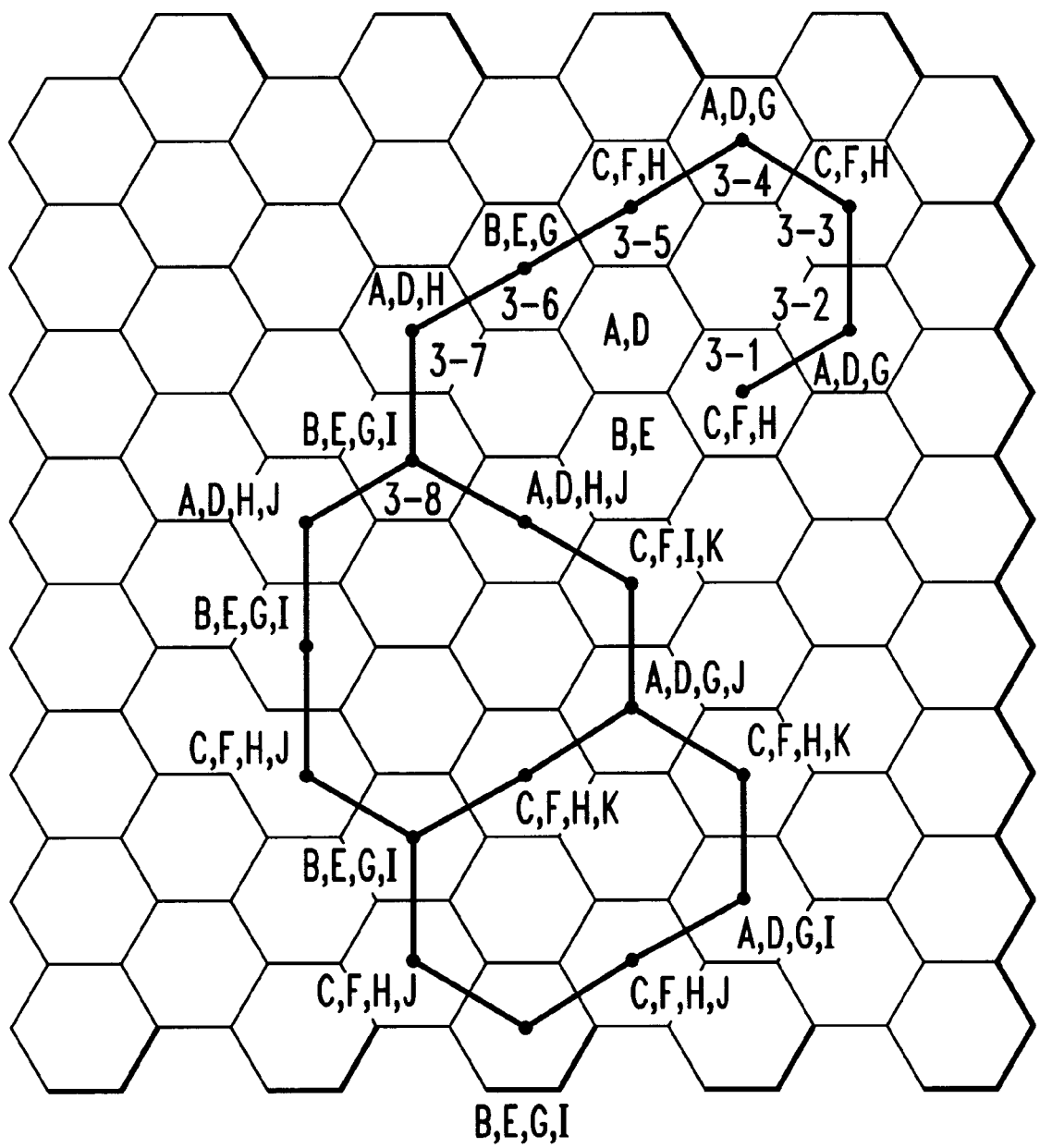
Figure 12D:
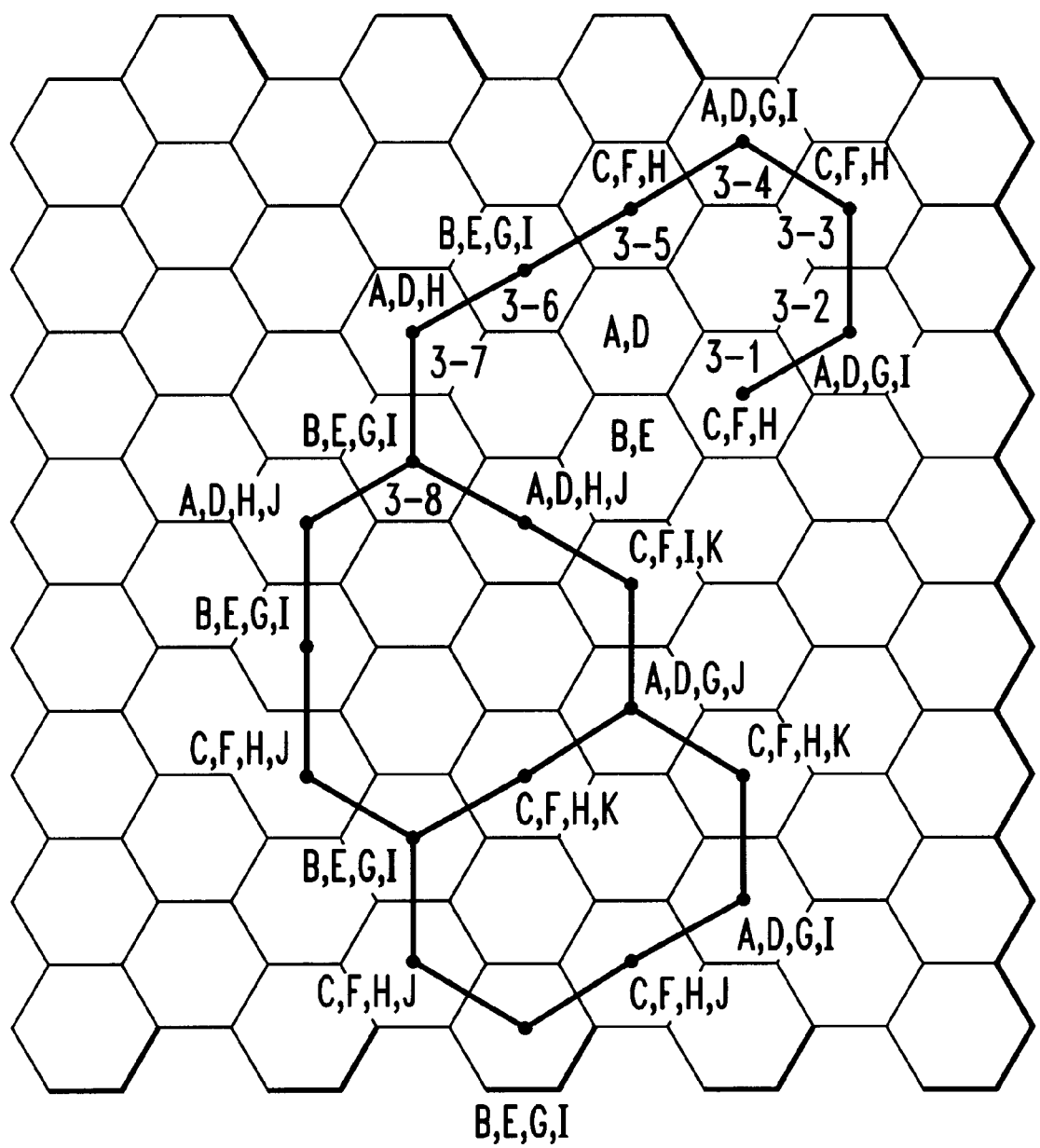
Figure 12E:
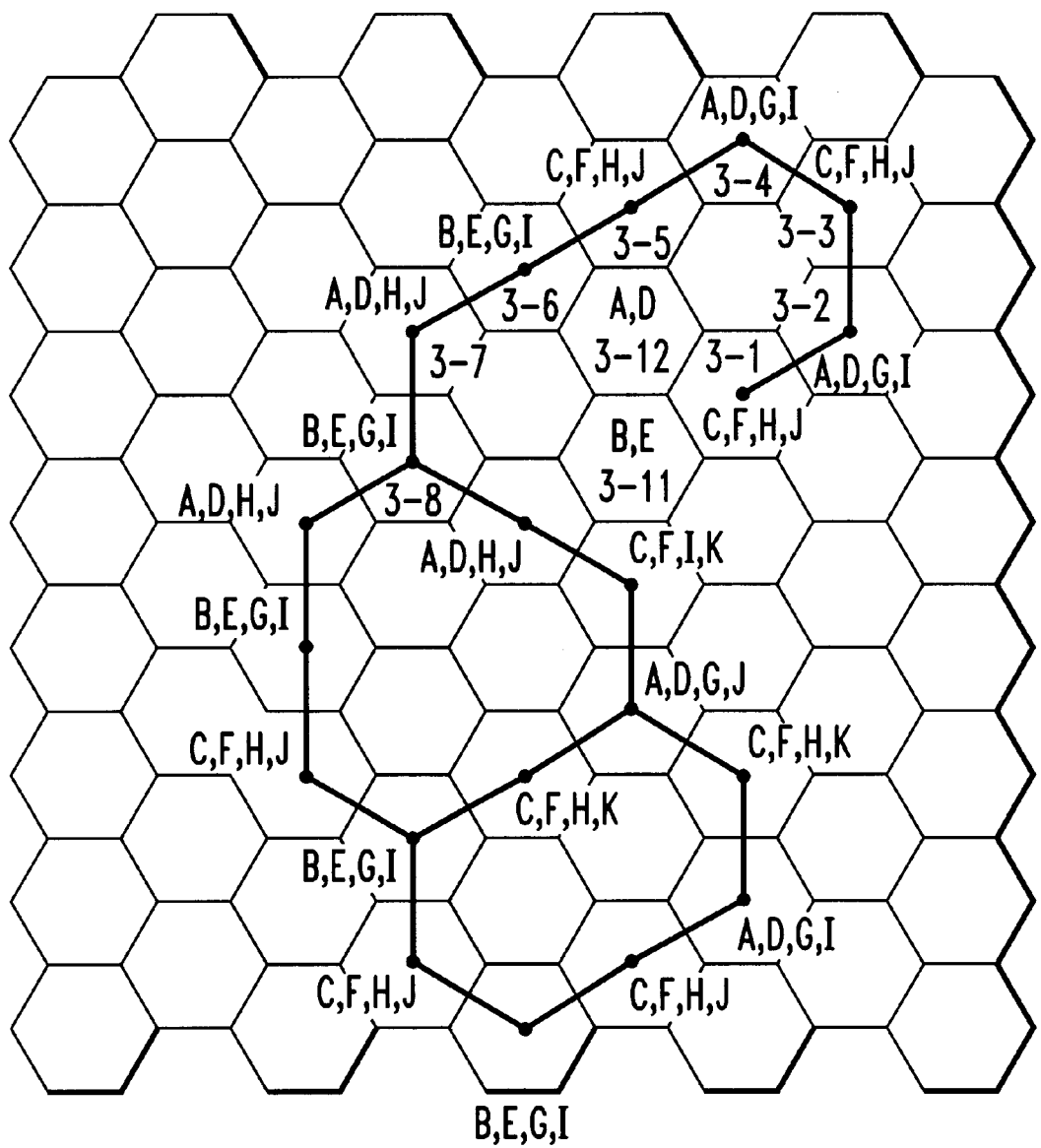

FIG. 12b depicts the assignment of channel G to chain 902. Again assigning channels in a clockwise manner, channel G is assigned to cell 3-6, 3-4 and 3-2. Channel G cannot be assigned to cell 3-7 because channel G has previously been assigned to adjacent cell 3-8. As shown in FIG. 12c, channel H is assigned to cell 3-7, 3-5, 3-3 and 3-1. Channel I is assigned to cells 3-6, 3-4 and 3-2, as depicted in FIG. 12d. The remaining unsatisfied channel demand of one unit is satisfied by assigning channel J to cells 3-7, 3-5, 3-3 and 3-1, as depicted in FIG. 12e. Note that channel K was not assigned. In other words, only four channels were required to satisfy a channel demand of two in chain 902, and indeed, in any chain. Moreover, while five channels are required to satisfy a channel demand of two in cycles having an odd number of cells, such as base cycle 906, only four channels are required to satisfy a channel demand of two in cycles having an even number of cells.

Thus, the channel demand of illustrative wireless telecommunications system 302 (FIG. 4) is fully satisfied by assigning 11 channels system wide. Four channels are assigned to all cells in the system with the exception of cells 3-11 and 3-12. Only two channels are assigned to cells 3-11 and 3-12 because that is all that is required to satisfy their channel demand of two.

The upper bound on the number of channels $\psi^d$ required to satisfy the system-wide call demand based on using the aforedescribed method for channel allocation is determined as follows. A channel demand is determined for each clique in the interference graph by adding up the channel demand for each cell in a given clique. The greatest channel demand of all cliques determines a "maximum clique demand" $\omega^d$. When mutually-interfering cells are adjacent cells, as in the present embodiment, the upper bound on the number of channels required to satisfy the system-wide call demand is given by the expression: $\psi^d \leq 17/12 \cdot \omega^d$.

For the foregoing example, maximum clique demand is 10, which is the clique demand of triangles T1 and T3. Thus, the upper bound on the system-wide channel requirement predicted by the foregoing expression is (17/12)×10=14.1 or 15 channels. The present method satisfied the demand with 11 channels.

The foregoing example demonstrated the manner in which method 200a for operating a wireless telecommunications system is implemented when channel allocation is performed considering only nearest (adjacent) cell interference. The implementation of method 200a for nearest and next-to-nearest cell interference is described below in Section II.

Section II—Channel Allocation for Nearest- and Next-to-Nearest Cell Interference As previously indicated, in operation 204 of the present method for operating a wireless telecommunications system, specific channels are tentatively assigned or allocated to each cell in the system.

Figure 2D:
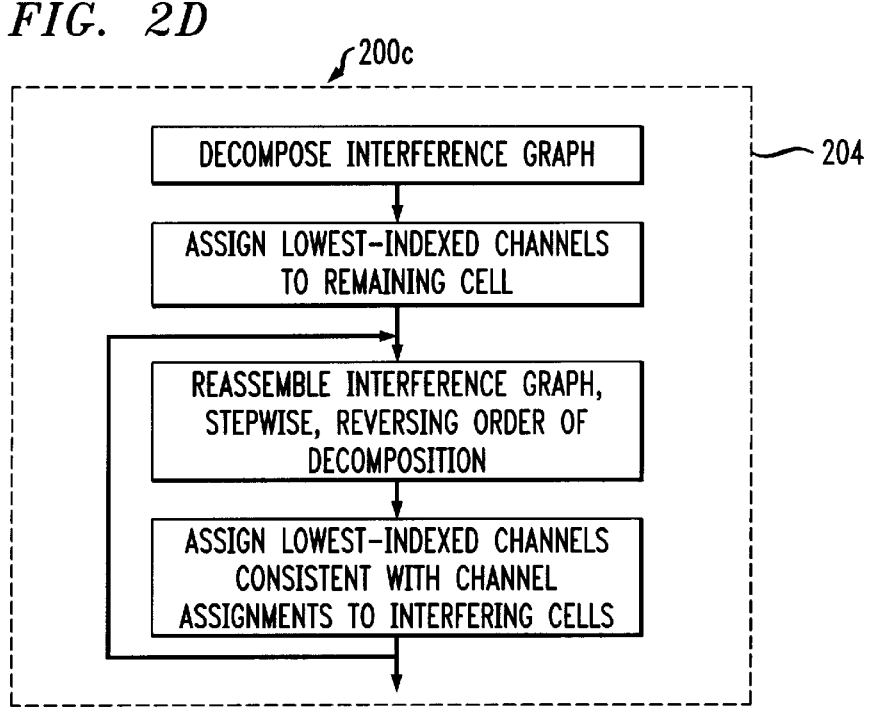
FIG. 2d depicts a method for channel allocation when nearest- and next-to-nearest cell interference is considered.

The operations used for allocating channels when considering next-to-nearest cell interference are analogous to those used to implement step 224 of method 200b for nearest-cell interference. In particular, in operation 242 of method 200c (FIG. 2d), the interference graph is decomposed until a single cell remains. Recall that for nearest-cell interference, the decomposition operation terminates when a single cycle remains. In operation 244, the lowest-indexed channels available are assigned to the single remaining cell as required to satisfy its channel demand. In operation 246, cells are "added-back," one at a time, in reverse of the order in which they were removed during decomposition operation 242. As each cell is added-back, channels are assigned to satisfy the full channel demand of the cell, as indicated in operation 248. The lowest available channels are assigned consistent with neighboring channel assignments.

Figure 13A:
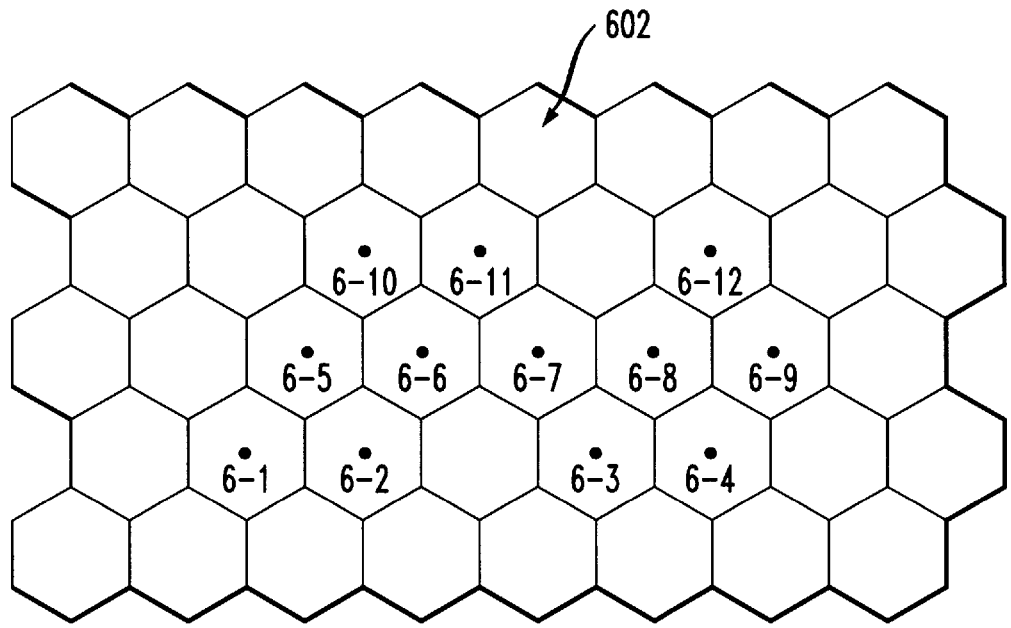
FIG. 13a depicts cells in an illustrative wireless telecommunications system.
Figure 13B:
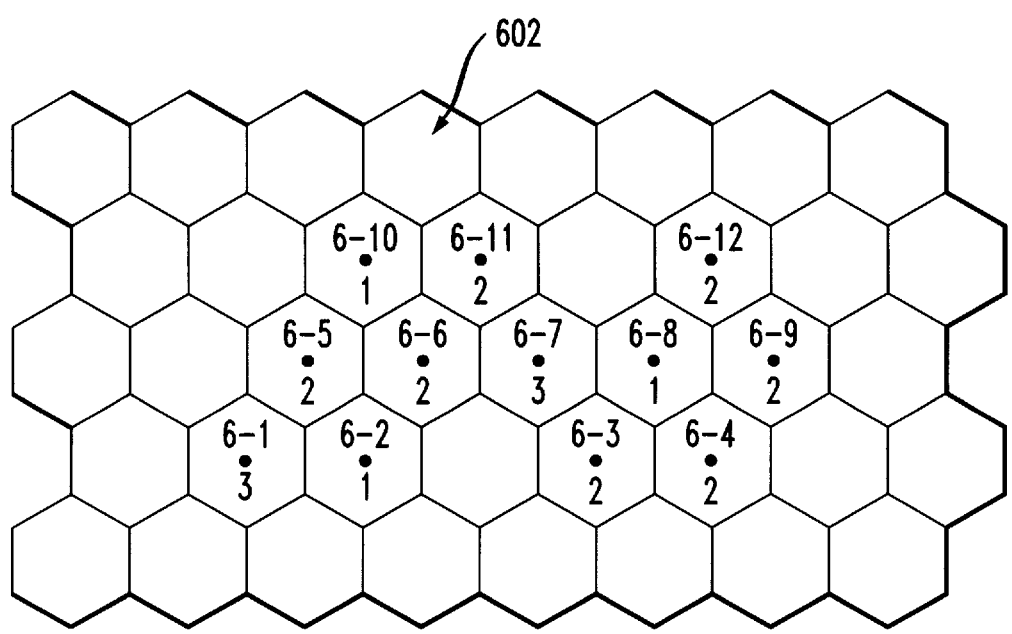
Figure 13C:
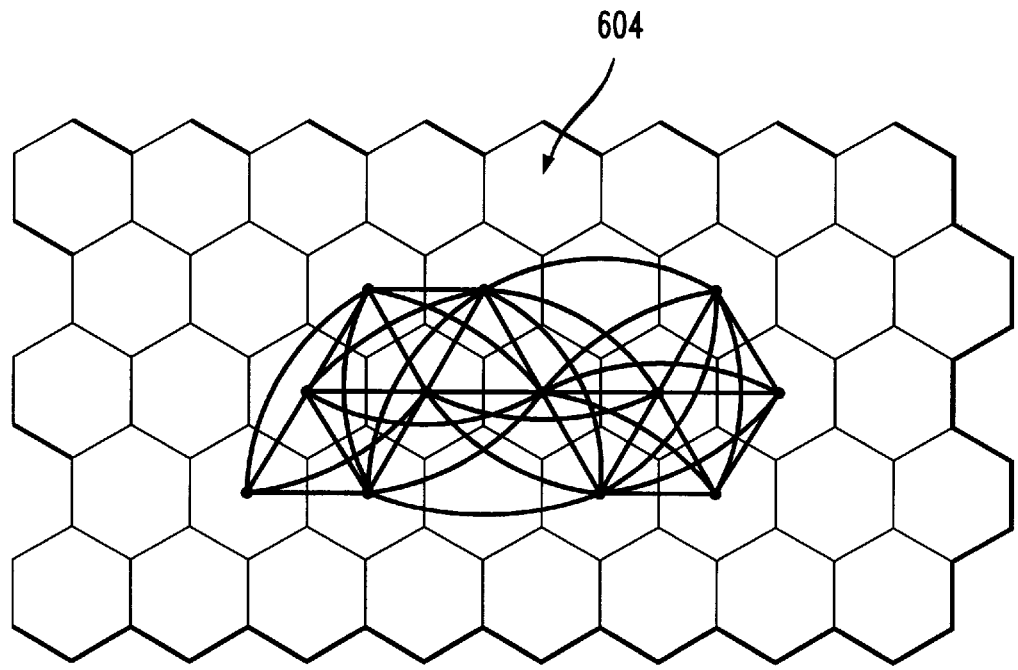
FIG. 13c depicts an interference graph defined by the cells of the wireless telecommunications system of FIG. 13a when interference is considered to occur between adjacent- and next-to-adjacent cells.

The implementation of operation 204, in accordance with method 200c, is demonstrated for illustrative wireless telecommunications system 602 depicted in FIG. 13a. System 602 includes cells 6-1 through 6-12 having the channel demands depicted in FIG. 13b. FIG. 13c depicts an interference graph 604 for the system 602 based on nearest- and next-to-nearest cell interference. Lines connecting next-to-nearest cells are curved for clarity.

Figure 14A:
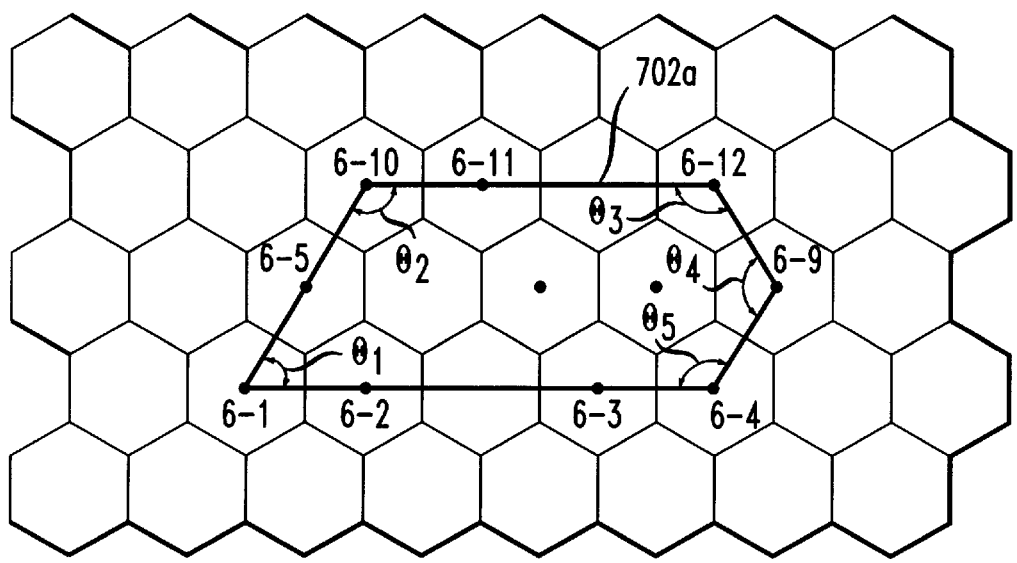
FIG. 14a depicts a boundary of the interference graph of FIG. 13c.

FIG. 14 depicts boundary or polygonal hull 702a of interference graph 604. Cells 6-1, 6-5, 6-10, 6-11, 6-12, 6-9, 6-4, 6-3 and 6-2 define boundary 702a. Cells 6-1, 6-10, 6-12, 6-9 and 6-4 are "vertices" of polygonal boundary 702a that subtend respective internal angles $\theta_1$, $\theta_2$, $\theta_3$, $\theta_3$, $\theta_4$, and $\theta_4$. In accordance with the present teachings, interference graph 604 is iteratively decomposed by selecting the cell on the boundary that subtends the smallest internal angle, and then removing that cell. The internal angle of each boundary vertex is measured according to known methods.

Figure 14B:
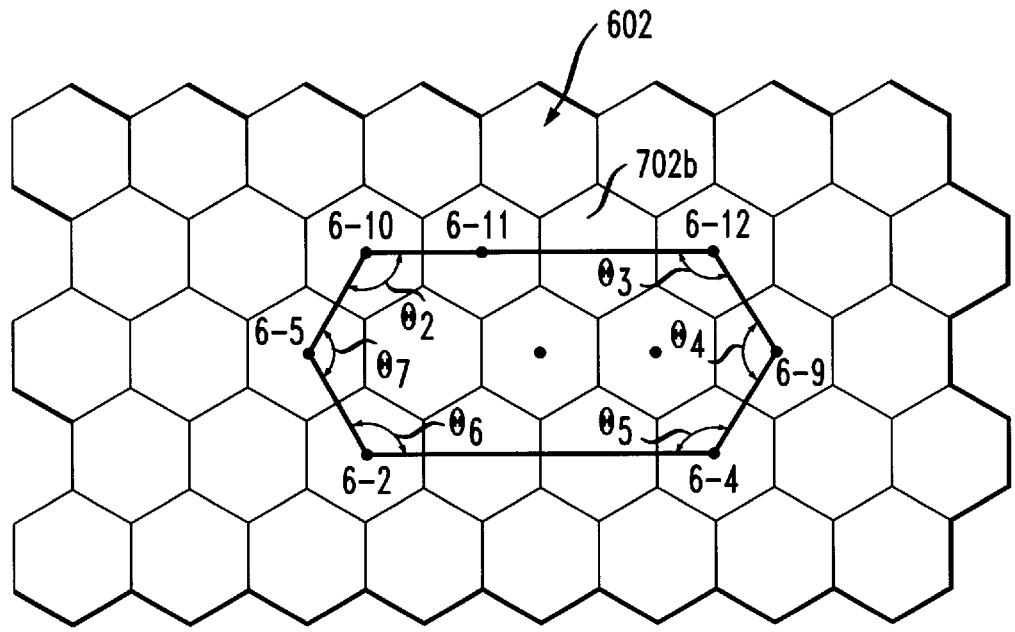
FIG. 14b depicts a boundary of the interference graph of FIG. 13c after one vertex is removed.

With reference to FIG. 14, cell 6-1 subtending internal angle $\theta_1$ equal to 60 degrees is the boundary cell or vertex with the smallest internal angle. FIG. 14b depicts boundary 702b of the interference graph for wireless telecommunications system 602. Four vertices that include cells 6-10, 6-12, 6-4 and 6-2 subtend the same minimum angle of 120 degrees. In such a case, selection of a cell for removal is somewhat arbitrary, although the specifics of the resulting channel assignment, and even the total number of channels ultimately assigned, may vary with such selection. When presented with such a choice, it is generally preferable to select a cell belonging to the same clique as those cells that have already been removed, if possible. Thus, either of cells 6-2 or 6-10 are removed in preference to cells 6-4 and 6-12. For the present example, cell 6-2 is removed.

Decomposition operation 242 thus proceeds until a single cell remains. Table 1 below lists the cells of system 602, in order of removal, and the size of the internal angle subtended thereby.

TABLE 1

Removal Order for Cells of System 602

| Order of Removal | Cell Identification | Internal Angle, Deg. |
| --- | --- | --- |
| 1 st | 6–1 | 60 |
| 2 nd | 6–2 | 120 |
| 3 rd | 6–5 | 60 |
| 4 th | 6–10 | 60 |
| 5 th | 6–6 | 90 |
| 6 th | 6–11 | 60 |
| 7 th | 6–7 | 90 |
| 8 th | 6–3 | 60 |
| 9 th | 6–4 | 60 |
| 10 th | 6–8 | 60 |
| 11 th | 6–9 | 60 |

Cell 6-12 is the final remaining cell. In accordance with operation 244 of method 200c, channels are allocated to cell 6-12 as required to satisfy its channel demand. As indicated in FIG. 13b, the channel demand of cell 6-12 is 2. Thus, the two lowest-indexed channels, which in the present example are channels A and B, are allocated to cell 6-12.

As indicated in operation 246, removed cells are added back in reverse order. As each cell is added back, channels are assigned to it. The final cell removed during the decomposition operation was cell 6-9. Thus, in accordance with operation 246, cell 6-9 is the first cell added-back As cell 6-9 is adjacent to cell 6-12, the next two channels in sequence are assigned to cell 6-9 to satisfy its full channel demand of two.

Figure 15A:
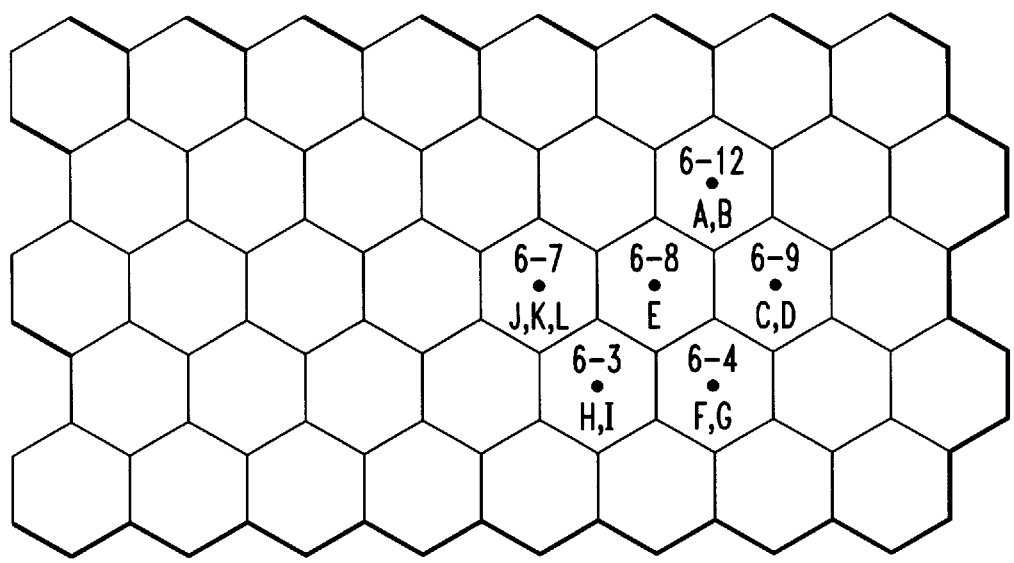
FIG. 15a depicts a channel allocation for the final cell and the first five cells added back in accordance with a channel allocation operation in accordance with the present teachings.
Figure 15B:
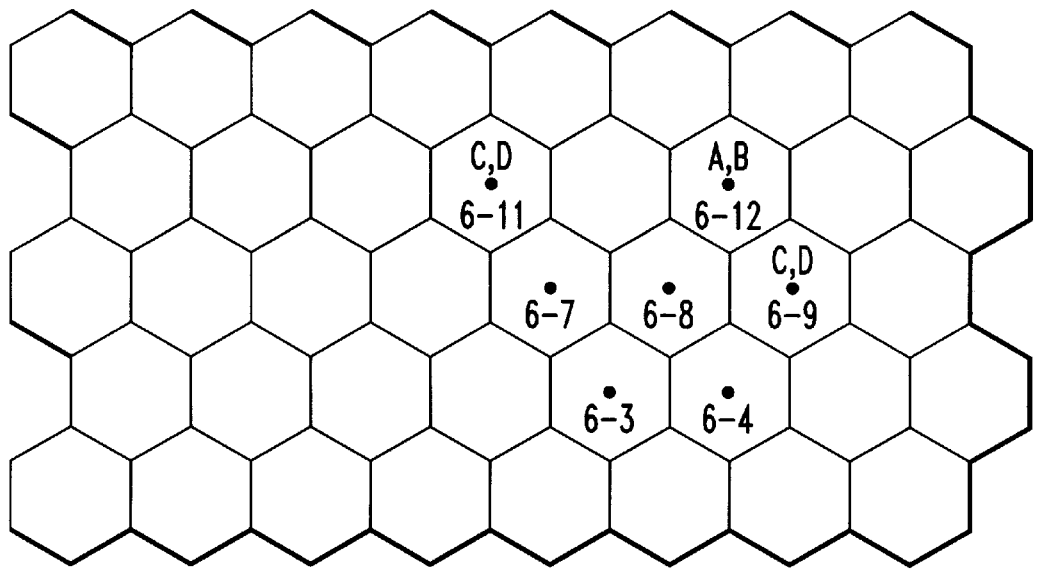
FIG. 15b depicts the channel allocation shown in FIG. 15a and for the sixth cell added back.

Channel assignments for the cell 6-12, and the first five cells that are added back, are depicted in FIG. 15. Note that the cells appearing in FIG. 15a are members of a clique (i.e., they are mutually-interfering cells). As such, a given channel may not be assigned to more than one cell in the clique. Since the channel demand of the clique depicted in FIG. 15a is 2+2+1+2+2+3=12, a total of twelve channels A–L must be assigned to such cells to satisfy that demand.

The next cell to be added-back is cell 6-11. Since cell 6-11 does not interfere with cells 6-9 and 6-4, it is not a member of the clique depicted in FIG. 15a. In accordance with the method, cell 6-9 is assigned the two lowest indexed channels available to satisfy its demand of two. Cells 6-11 is a next-to-nearest neighbor of cell 6-12. As such, they interfere. Therefore, channels A and B, which have been assigned to cell 6-12, cannot be assigned to cell 6-11. The next lowest channels are channels C and D. Cell 6-9 has been assigned channels C and D. Since channels 6-11 and 6-9 are not nearest- or next-to-nearest neighbors, they do not interfere. As such, channels C and D are assigned to cell 6-11.

Figure 15C:
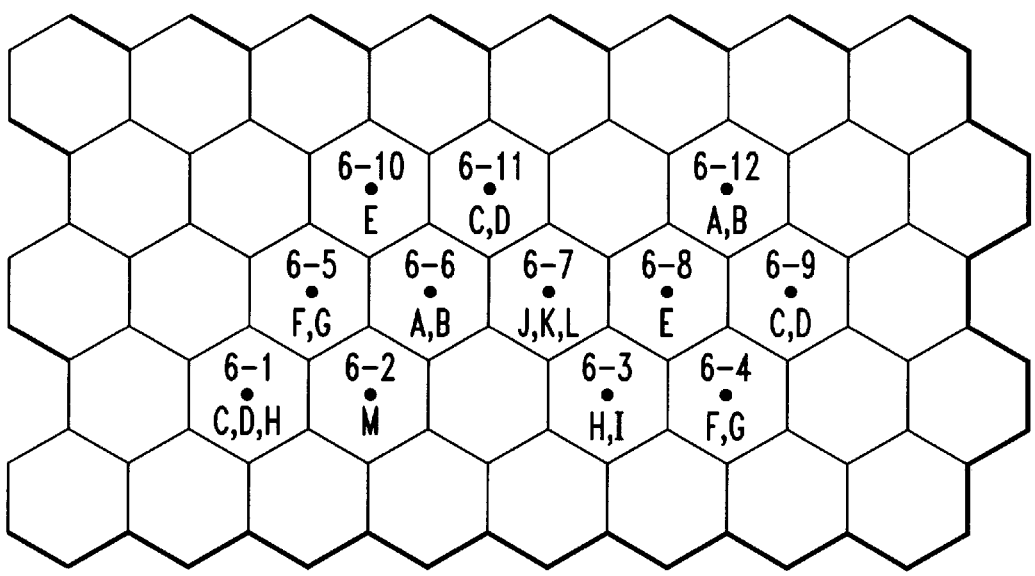

Operations 246 and 248 are repeated until all cells have been added back to interference graph. The allocation of channels to all cells in system 602 is depicted in FIG. 15c. Thirteen channels A–M are assigned to satisfy the system-wide channel demand.

When mutually-interfering cells are adjacent and next-to-adjacent cells, as in the present embodiment, the upper bound on the number of channels required to satisfy the system-wide call demand is given by the expression: $\psi^d \leq 2 \cdot \omega^d - d_{min}$, wherein $d_{min}$ is the minimum channel demand, per cell, system wide.

For the foregoing example, maximum clique demand is 12 and minimum channel demand is 1. Thus, the upper bound on the system-wide channel requirement predicted by the foregoing expression is [2×(12)]–1=24 channels. The present method satisfied the demand with 13 channels.

The foregoing example demonstrated the manner in which method 200a for operating a wireless telecommunications system is implemented when channel allocation is performed considering nearest (adjacent) and next-to-nearest cell interference.

Details concerning the derivation of the present methods are not necessary for understanding or using the present invention, and, as such, are not presented herein. Such details are provided in a paper by the inventors entitled "On Wireless Spectrum Estimation and Generalized Graph Coloring," presented at IEEE INFOCOM '98, Mar. 29–Apr. 2, 1998 in San Francisco, Calif. (17th Annual Joint Conf. Of the IEEE Computer and Communications Society), incorporated herein by reference.

It is to be understood that the embodiments described herein are merely illustrative of the present invention. Other embodiments can be devised in application of the present teachings by those skill in the art without departing from the scope and spirit of the invention. It is therefore intended that such other embodiments be included within the scope of the following claims and their equivalents.

We claim:

1. A method for operating a wireless telecommunications system, comprising the steps of:
   determining channel demand for each cell in the system;
   determining a tentative channel allocation by iteratively assigning channels to each cell until the channel demand in each cell is satisfied; and
   allocating channels to each cell according to the tentative channel allocation;
   wherein channel allocation is based on adjacent-cell interference;
   and wherein the step of iteratively assigning comprises:
   defining a first interference graph from interfering cells;
   satisfying at least a portion of the channel demand in all interfering cells using a three-channel-allocation operation, wherein, the three-channel-allocation operation is continued until the channel demand in at least one cell in each group of three mutually-interfering cells is reduced to zero; and
   satisfying remaining channel demand.

2. The method of claim 1, wherein the step of determining a tentative channel allocation further comprises:
   obtaining an updated channel demand for each cell in the system; and
   updating said tentative channel allocation using a dynamic channel allocation routine based on said updated channel demand and said tentative channel allocation.

3. The method of claim 1, wherein the step of satisfying remaining channel demand comprises using a five-channel allocation operation.

4. The method of claim 3, wherein the step of satisfying remaining channel demand further comprises the steps of:
   defining a second interference graph from interfering cells having non-zero channel demand after the three-channel-allocation operation is complete;
   decomposing the second interference graph by sequentially removing portions thereof until a group of interfering cells defining a single cycle remains;
   assigning channels to the single cycle;
   reconstructing the second interference graph by stepwise addition of each removed portion thereof in reverse order of removal; and
   assigning channels to each added portion before adding a next removed portion.

5. The method of claim 4, wherein the steps of assigning channels to the single cycle and to each added portion further comprises using the five-channel-allocation operation.

6. A method for operating a wireless telecommunications system, comprising the steps of:
   determining channel demand for each cell in the system;
   determining a tentative channel allocation by iteratively assigning channels to each cell until the channel demand in each cell is satisfied; and
   allocating channels to each cell according to the tentative channel allocation;
   wherein the channel allocation is based on adjacent- and next-to-adjacent cell interference;
   and wherein the step of iteratively assigning comprises:
   defining a first interference graph;
   decomposing the first interference graph by sequentially removing cells thereof until a single cell remains;
   assigning one or more channels to the single cell as required to satisfy the channel demand of the cell;
   reconstructing the first interference graph by stepwise addition of each removed cell thereof in reverse order of removal; and
   assigning channels to each added cell before adding a next removed cell.

7. The method of claim 6, wherein the step of defining a first interference graph further comprises the steps of:
   defining a polygonal boundary of the first interference graph, the polygonal boundary having a plurality of vertices each characterized by an internal angle, each vertex being a cell;
   determining a magnitude of the internal angle for each vertex and a minimum magnitude among all said magnitudes.

8. The method of claim 7, wherein the step of decomposing comprises the steps of:
   (A) removing a cell characterized by an internal angle having the minimum magnitude;
   (B) defining a revised polygonal boundary that does not include the removed cell;
   (C) determining a magnitude of the internal angle for each vertex in the revised polygonal boundary and a minimum magnitude among all said magnitudes; and
   (D) repeating steps (A) through (C) until a single cell remains.

9. The method of claim 8, wherein the step of assigning channels to each added cell further comprises the step of assigning to an added cell the lowest-indexed channels not assigned to any cells interfering with the added cell.

10. A method for operating a wireless telecommunications system, wherein communication channels are allocated to cells within the system based on adjacent-cell interference, comprising the steps of:
    determining channel demand for each cell in the system;
    allocating one or more channels to each cell as required to satisfy a channel demand for each cell, wherein channels are allocated by:
    defining a first interference graph from interfering cells;
    satisfying at least a portion of the channel demand in all interfering cells using a three-channel-allocation operation, wherein, the three-channel-allocation operation is continued until the channel demand in at least one cell in each group of three mutually-interfering cells is reduced to zero; and
    satisfying remaining channel demand using a five-channel allocation operation.

11. The method of claim 10, wherein the step of satisfying remaining channel demand further comprises the steps of:
    defining a second interference graph from interfering cells having non-zero channel demand after the three-channel-allocation operation is complete;
    decomposing the second interference graph by sequentially removing portions thereof until a group of interfering cells defining a single cycle remains;
    assigning channels to the single cycle using the five-channel-allocation operation;
    reconstructing the second interference graph by stepwise addition of each removed portion thereof in reverse order of removal; and
    assigning channels to each added portion before adding a next removed portion, wherein channels are assigned using the five-channel-allocation operation.

12. A method for operating a wireless telecommunications system, wherein communication channels are allocated to cells within the system based on adjacent- and next-to-adjacent cell interference, comprising the steps of:

determining channel demand for each cell in the system;

allocating one or more channels to each cell as required to satisfy a channel demand for each cell, wherein channels are allocated by:

defining an interference graph from interfering cells;

sequentially removing cells from the interference graph until a single cell remains, wherein the sequence of removal is based on a geometric property of the interference graph;

allocating a lowest-indexed one or more channels to the single cell as required to satisfy a channel demand of the single cell;

sequentially reconstructing the interference graph by adding back the removed cells in reverse order of their removal and allocating a lowest-indexed acceptable one or more channels to each added cell before adding the next removed cell, wherein the acceptability of the allocated channels is dependent upon the prior allocation of channels to interfering cells.

13. The method of claim 12, wherein a boundary of the interference graph is defined from a portion of the interfering cells, at least some of which portion of interfering cells define vertices of the boundary, wherein the geometric property is a magnitude of an internal angle subtended by each vertex.

14. The method of claim 13, wherein a cell defining a vertex having a minimum magnitude among all said magnitudes is removed.

* * * * *